United States Patent
Zhang et al.

(10) Patent No.: US 11,209,645 B2
(45) Date of Patent: Dec. 28, 2021

(54) DISPLAY DEVICE AND METHOD, HEAD-UP DISPLAY SYSTEM, MEANS OF TRANSPORTATION AND STORAGE MEDIUM

(71) Applicants: Hefei Xinsheng Optoelectronics Technology Co., Ltd., Hefei (CN); BOE Technology Group Co., Ltd., Beijing (CN)

(72) Inventors: Yisan Zhang, Beijing (CN); Yongcan Wang, Beijing (CN)

(73) Assignees: Hefei Xinsheng Optoelectronics Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 173 days.

(21) Appl. No.: 16/465,414

(22) PCT Filed: Oct. 26, 2018

(86) PCT No.: PCT/CN2018/112207
§ 371 (c)(1),
(2) Date: May 30, 2019

(87) PCT Pub. No.: WO2019/148908
PCT Pub. Date: Aug. 8, 2019

(65) Prior Publication Data
US 2021/0096362 A1 Apr. 1, 2021

(30) Foreign Application Priority Data
Jan. 31, 2018 (CN) .......................... 201810097639.4

(51) Int. Cl.
*G02B 27/01* (2006.01)
*B60K 35/00* (2006.01)

(52) U.S. Cl.
CPC .......... *G02B 27/0101* (2013.01); *B60K 35/00* (2013.01); *B60K 2370/1523* (2019.05);
(Continued)

(58) Field of Classification Search
CPC ............... G09G 3/001; G09G 2354/00; G02B 27/0093; G02B 27/01; G02B 2027/014; G02B 2027/0159
See application file for complete search history.

(56) References Cited

U.S. PATENT DOCUMENTS 5,576,886 A 11/1996 Ferrante
8,033,706 B1 * 10/2011 Kelly ................ G02F 1/133606
362/607
(Continued)

FOREIGN PATENT DOCUMENTS

CN 102081187 A 6/2011
CN 105974583 A 9/2016
(Continued)

OTHER PUBLICATIONS

Dec. 11, 2019—(CN) First Office Action Appn 201810097639.4 with English Translation.
(Continued)

*Primary Examiner* — Christopher E Leiby
(74) *Attorney, Agent, or Firm* — Banner & Witcoff, Ltd.

(57) ABSTRACT

A display device and method, a head-up display system, a means of transportation and a storage medium are disclosed. The display device includes a display module, an image analysis device and a controller. The display module includes a plurality of display subareas, and each of the display subareas includes at least one display pixel; the image analysis device is configured to perform an analysis of an input image received by the image analysis device, so as to obtain an information zone of the input image and a
(Continued)

non-information zone outside the information zone; and the controller is configured to render brightness of a display pixel, with a lowest brightness in a first region, in the first region of the display module higher than brightness of any display pixel in at least part of a second region of the display module, when the display module displays the input image.

18 Claims, 13 Drawing Sheets

(52) U.S. Cl.
CPC ...... *B60K 2370/1529* (2019.05); *B60K 2370/343* (2019.05); *G02B 2027/014* (2013.01); *G02B 2027/0118* (2013.01)

(56) References Cited

U.S. PATENT DOCUMENTS

| | | | |
|---|---|---|---|
| 2003/0043470 A1 | 3/2003 | Harter et al. | |
| 2009/0034230 A1* | 2/2009 | Lim | G02B 6/0061 362/84 |
| 2012/0162576 A1* | 6/2012 | Sakamoto | G02B 6/0016 349/65 |
| 2012/0307518 A1* | 12/2012 | Lee | G02B 6/0073 362/602 |
| 2013/0307831 A1* | 11/2013 | Robinson | G02B 6/0048 345/207 |
| 2014/0133177 A1* | 5/2014 | Miller | G02B 6/005 362/607 |
| 2015/0205134 A1* | 7/2015 | Bailey | G02B 27/0172 345/8 |
| 2016/0266391 A1* | 9/2016 | Han | G09G 3/001 |
| 2018/0267307 A1 | 9/2018 | Yoshida et al. | |
| 2019/0250703 A1* | 8/2019 | Price | G01J 1/0437 |
| 2019/0265468 A1* | 8/2019 | Hirata | G02B 27/0179 |
| 2019/0369393 A1* | 12/2019 | Misawa | G02B 27/0149 |
| 2020/0241196 A1* | 7/2020 | Wang | G02B 6/0068 |

FOREIGN PATENT DOCUMENTS

| | | |
|---|---|---|
| CN | 106597752 A | 4/2017 |
| CN | 107357040 A | 11/2017 |
| DE | 102008062157 A1 | 6/2011 |
| WO | 2017122300 A1 | 7/2017 |

OTHER PUBLICATIONS

Jan. 18, 2019—(WO) International Search Report and Written Opinion Appn PCT/CN2018/112207 with English Translation.
Sep. 24, 2021—EP—EESR Appn 18880045.2.

* cited by examiner

DISPLAY DEVICE AND METHOD, HEAD-UP DISPLAY SYSTEM, MEANS OF TRANSPORTATION AND STORAGE MEDIUM

The application is a U.S. National Phase Entry of International Application No. PCT/CN2018/112207 filed on Oct. 26, 2018, designating the United States of America and claiming priority to Chinese Patent Application No. 201810097639.4, filed on Jan. 31, 2018. The present application claims priority to and the benefit of the above-identified applications and the above-identified applications are incorporated by reference herein in their entirety.

TECHNICAL FIELD

Embodiments of the present disclosure relate to a display device and method, a head-up display system, a means of transportation and a storage medium.

BACKGROUND

A Head-up Display (referred to as HUD) is a kind of vehicle-mounted display system, the HUD can project and display vehicle status information such as vehicle speed, fuel level, and the like as well as indicative information such as navigation, danger warning and the like on a windshield ahead of a driver, and thus the driver can obtain the vehicle speed, fuel level and other relevant information while guaranteeing the driver's sightline does not deviate from the road ahead.

SUMMARY

At least one embodiment of the present disclosure provides a display device, which comprises a display module, an image analysis device and a controller. The display module comprises a plurality of display subareas, and each of the display subareas comprises at least one display pixel; the image analysis device is configured to perform an analysis of an input image received by the image analysis device, so as to obtain an information zone of the input image and a non-information zone outside the information zone; and the controller is configured to render brightness of a display pixel, with a lowest brightness in a first region, in the first region of the display module higher than brightness of any display pixel in at least part of a second region of the display module, when the display module displays the input image. The first region of the display module is a display subarea of the display module corresponding to the information zone of the input image, and the second region of the display module is a display subarea of the display module corresponding to the non-information zone of the input image.

For example, in the display device provided by at least one embodiment of the present disclosure, the controller is further configured to render the brightness of the display pixel, with the lowest brightness in the first region, in the first region of the display module higher than brightness of any display pixel in the second region of the display module, when the display module displays the input image.

For example, in the display device provided by at least one embodiment of the present disclosure, the display module comprises a backlight module; the backlight module comprises a plurality of backlight subregions; the plurality of backlight subregions respectively belong to the plurality of display subareas of the display module; and the controller is configured to let a backlight subregion corresponding to the information zone have a first light output amount, and to let a backlight subregion corresponding to the non-information zone have a second light output amount, in which the first light output amount is higher than the second light output amount.

For example, in the display device provided by at least one embodiment of the present disclosure, the second light output amount of the backlight subregion corresponding to the non-information zone is equal to zero.

For example, in the display device provided by at least one embodiment of the present disclosure, the backlight module comprises a light guiding plate and a light source; the light source comprises a plurality of luminous elements, and each of the backlight subregions comprises at least one of the luminous elements; and the controller is configured to allow a luminous element of the backlight subregion corresponding to the information zone to be in a turned-on state, so as to allow the backlight subregion corresponding to the information zone to have the first light output amount, and the controller is further configured to allow a luminous element of the backlight subregion corresponding to the non-information zone to be in a turned-off state or a brightness reduced state, so as to allow the backlight subregion corresponding to the non-information zone to have the second light output amount. The first light output amount is higher than the second light output amount.

For example, in the display device provided by at least one embodiment of the present disclosure, the light guiding plate comprises a plurality of light guiding regions that respectively correspond to the plurality of backlight subregions; and a position corresponding to a light-entering face of each of the light guiding regions is provided with at least one of the luminous elements.

For example, in the display device provided by at least one embodiment of the present disclosure, the light-entering face is at least partial region of a side surface of the light guiding plate; and the plurality of light guiding regions are in a single row, and the each of the light guiding regions comprises one light-entering face or two light-entering faces.

For example, in the display device provided by at least one embodiment of the present disclosure, the light-entering face is at least partial region of a side surface of the light guiding plate; and the plurality of light guiding regions are in two rows, and the each of the light guiding regions comprises one light-entering face.

For example, in the display device provided by at least one embodiment of the present disclosure, the light guiding plate further comprises a light blocking structure formed on an interface between the light guiding regions that are adjacent, so as to prevent optical crosstalk.

For example, in the display device provided by at least one embodiment of the present disclosure, the display module further comprises a liquid crystal panel and a light shading layer; and the light shading layer is between the liquid crystal panel and the backlight module, and the light shading layer is configured to reduce a divergence angle of light that is incident onto the liquid crystal panel.

For example, in the display device provided by at least one embodiment of the present disclosure, the light shading layer comprises light transmissive zones and light shading zones for separating the light transmissive zones; the light shading zones partially overlap with an orthographic projection of the each of the light guiding regions on the light shading layer; and an orthographic projection of an edge of the each of the light guiding regions on the light shading layer is completely covered by the light shading zones. The edge is adjacent to another of the light guiding regions.

At least one embodiment of the present disclosure further provides a head-up display system, which comprises any display device provided by embodiments of the present disclosure.

At least one embodiment of the present disclosure further provides means of transportation, which comprises any display device or any head-up display system provided by embodiments of the present disclosure.

At least one embodiment of the present disclosure further provides a display method, which comprises: performing an analysis of an input image received, so as to obtain an information zone of the input image and a non-information zone outside the information zone; and rendering brightness of a display pixel, with a lowest brightness in a first region, in the first region of a display module higher than brightness of any display pixel in at least part of a second region of the display module when the input image is displayed by the display module. The first region of the display module is a display subarea of the display module corresponding to the information zone of the input image, and the second region of the display module is a display subarea of the display module corresponding to the non-information zone of the input image.

For example, in the display method provided by at least one embodiment of the present disclosure, the brightness of the display pixel, with the lowest brightness in the first region, in the first region of the display module is allowed to be higher than brightness of any display pixel in the second region of the display module when the input image is displayed by the display module.

For example, in the display method provided by at least one embodiment of the present disclosure, the display module comprises a backlight module; the backlight module comprises a plurality of backlight subregions respectively belonging to the plurality of display subareas of the display module; and allowing of the brightness of the display pixel, with the lowest brightness in the first region, in the first region of the display module to be higher than the brightness of any display pixel in the second region of the display module comprises: allowing a backlight subregion corresponding to the information zone to have a first light output amount, and allowing a backlight subregion corresponding to the non-information zone to have a second light output amount, in which the first light output amount is higher than the second light output amount.

For example, in the display method provided by at least one embodiment of the present disclosure, the second light output amount is equal to zero.

For example, in the display method provided by at least one embodiment of the present disclosure, the backlight module comprises a light guiding plate and a light source; the light source comprises a plurality of luminous elements, and each of the backlight subregions comprises at least one of the luminous elements; allowing of the backlight subregion corresponding to the information zone to have the first light output amount comprises: allowing a luminous element of the backlight subregion corresponding to the information zone to be in a turned-on state; and allowing of the backlight subregion corresponding to the non-information zone to have the second light output amount comprises: allowing a luminous element of the backlight subregion corresponding to the non-information zone to be in a turned-off state or a brightness reduced state.

At least one embodiment of the present disclosure further provides a display device, which comprises a display module, a processor and a memory. The display module comprises a plurality of display subareas, and each of the display subareas comprises at least one display pixel; computer program instructions suitable to be executed by the processor stored in the memory; and upon being executed by the processor, the computer program instructions carry out one or more of following steps: performing an analysis of an input image received, so as to obtain an information zone of the input image and a non-information zone outside the information zone; controlling the display module, so as to allow brightness of a display pixel, with a lowest brightness in a first region, in the first region of the display module to be higher than brightness of any display pixel in at least part of a second region of the display module when the display module displays the input image, in which the first region of the display module is a display subarea of the display module corresponding to the information zone of the input image, and the second region of the display module is a display subarea of the display module corresponding to the non-information zone of the input image.

At least one embodiment of the present disclosure further provides a storage medium. Computer program instructions are stored in the storage medium, and the computer program instructions, upon being executed by a processor, carry out one or more of following steps: performing an analysis of an input image received, so as to obtain an information zone of the input image and a non-information zone outside the information zone; controlling a display module, so as to allow brightness of a display pixel, with a lowest brightness in a first region, in the first region of the display module to be higher than brightness of any display pixel in at least part of a second region of the display module when the display module displays the input image, in which the first region of the display module is a display subarea of the display module corresponding to the information zone of the input image, and the second region of the display module is a display subarea of the display module corresponding to the non-information zone of the input image.

BRIEF DESCRIPTION OF THE DRAWINGS

In order to illustrate technical schemes of embodiments of the present disclosure more clearly, attached drawings of the embodiments will be briefly introduced below. Obviously, the attached drawings as described below merely relate to some embodiments of the present disclosure, but are not limitation of this disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

As noticed by inventors of the present disclosure, an image that is projected by current head-up display systems on a windshield in the front of a vehicle (i.e., a front window) have a potentially adverse effect on the driver's observation of objects outside the front window, especially for driving at night. The above-mentioned issue will be described in detail below in conjunction with FIG. 1A to FIG. 1C.

Figure 1A:
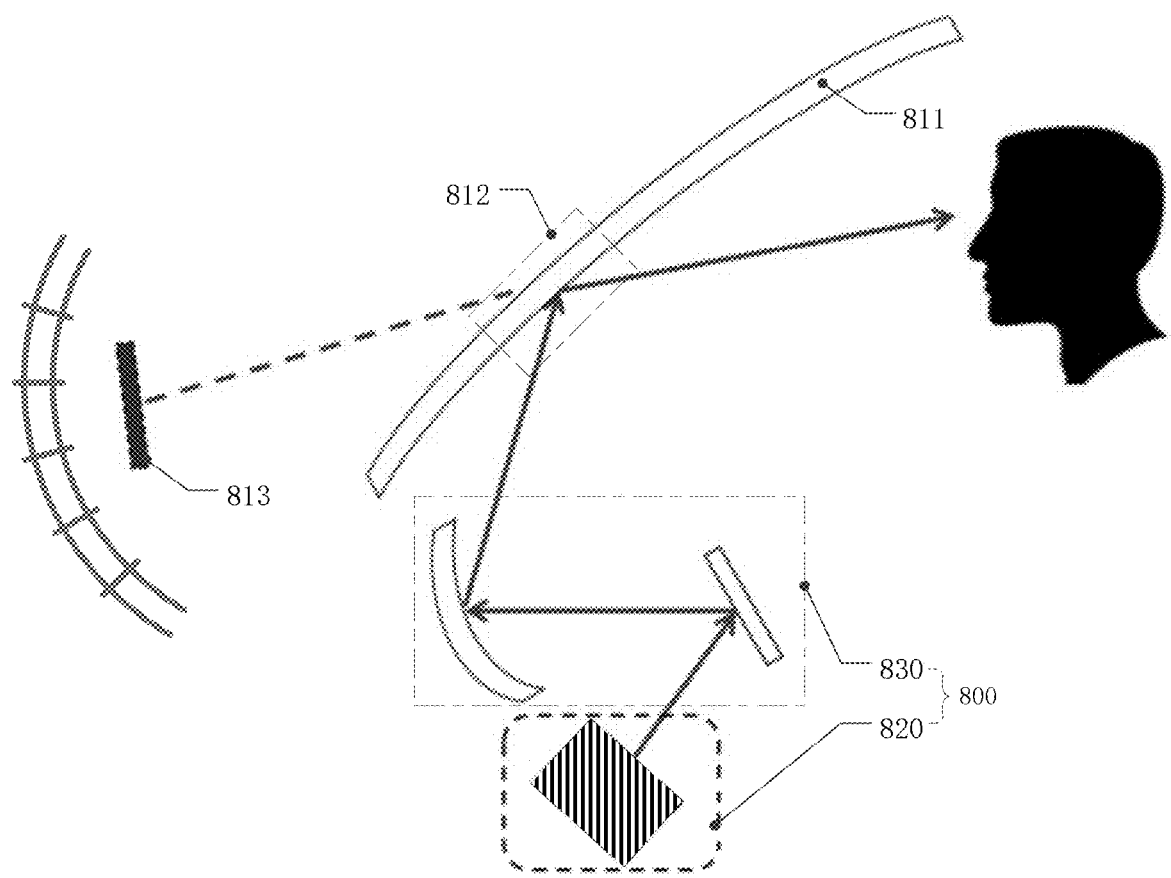
FIG. 1A is a schematic view illustrating a head-up display system.
Figure 1B:
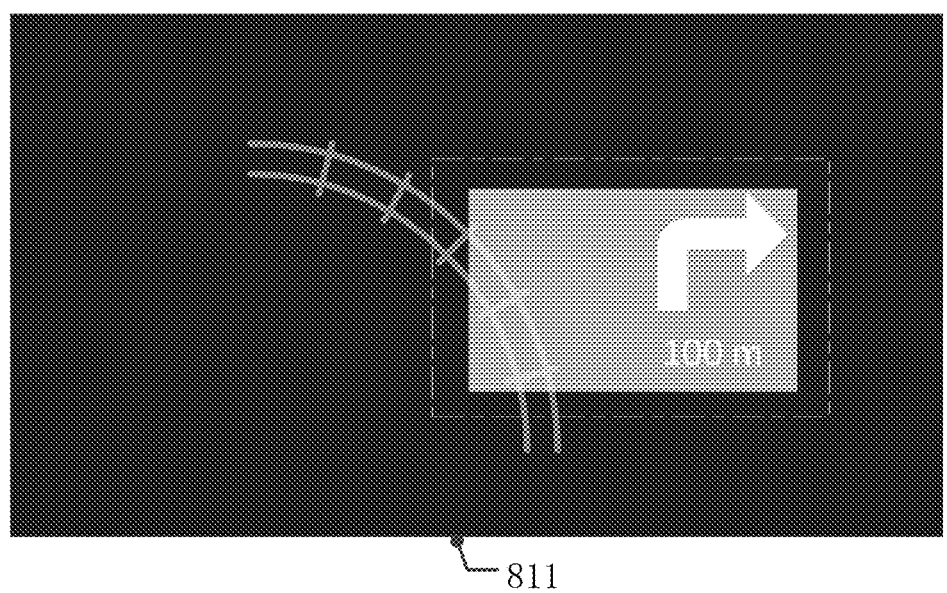
FIG. 1B is a diagram illustrating an application scene of the head-up display system as illustrated in FIG. 1A.
Figure 1C:
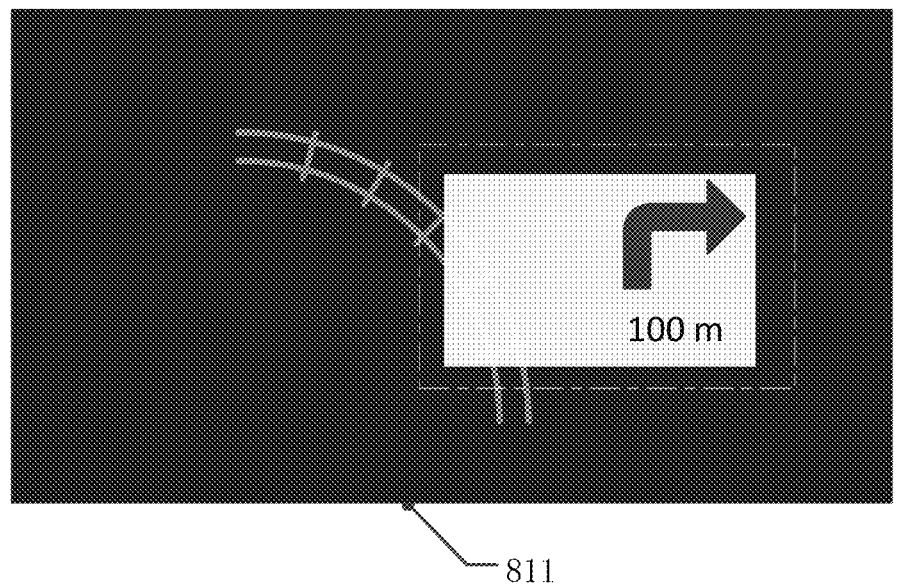
FIG. 1C is a diagram illustrating another application scene of the head-up display system as illustrated in FIG. 1A.

FIG. 1A is a schematic view illustrating a head-up display system 800. For example, as illustrated in FIG. 1A, the head-up display system 800 may include a display device 820 and an image projecting structure 830. For example, as illustrated in FIG. 1A, an information image may be displayed by the display device 820, and the information image provided by the display device 820 may be received by the image projecting structure 830 and be projected onto an image displaying zone 812 (i.e., a zone enclosed by a dashed-line box in FIG. 1B and FIG. 1C) on a front window 811 by the image projecting structure 830. After that, light of the information image may be transmitted to the driver's eyes by way of being reflected by the front window 811, and the information image seen by the driver may be a virtual image 813 located on the side of the front window 811 away from the driver. In addition, besides the information image reflected by the front window 811, the driver's eyes can also see objects outside the vehicle (e.g., guide rails as illustrated in FIGS. 1B and 1C) when looking through the front window 811, so as to perform driving operation, etc.

For example, the display device 820 may include a backlight source and a liquid crystal panel disposed at the light exiting side of the backlight source. In the case where the predetermined display brightness of display pixels of the liquid crystal panel is zero, there are still traces of stray light that passes the display pixels and exits from the light exiting side of the liquid crystal panel. This can make it difficult for the liquid crystal panel to achieve a full dark state (that is, the display brightness for display pixels, the predetermined display brightness of which is zero, is not zero). Accordingly, for all regions of the image display zone 812, none of them has a zero brightness, and this may not only increase power consumption and reduce the contrast of information image observed by the driver, but also cause part of light reflected by the image display zone 812 to adversely interfere with the driver's observation of objects outside the vehicle (for example, part of light of information image that are reflected by the image display zone 812 and into the driver's eyes adversely interfere with part of light of guide rail that passes through the front window 811 and into the driver's eyes), especially for driving at night. Thus, the driving safety may be degraded.

Embodiments of the present disclosure provides a display device and method, a head-up display system, a means of transportation and a storage medium, by which the improvement of safety during using is realized.

At least one embodiment of the present disclosure provides a display device, which comprises a display module, an image analysis device and a controller. The display module comprises a plurality of display subareas, and each of the display subareas comprises at least one display pixel; the image analysis device is configured to perform an analysis of an input image received by the image analysis device, so as to obtain an information zone of the input image and a non-information zone outside the information zone; and the controller is configured to render brightness of a display pixel, with a lowest brightness in a first region, in the first region of the display module higher than brightness of any display pixel in at least part of a second region of the display module, when the display module displays the input image. The first region of the display module is a display subarea of the display module corresponding to the information zone of the input image, and the second region of the display module is a display subarea of the display module corresponding to the non-information zone of the input image.

The position of partial zone in the second region may be selected according to needs, and for example, a region that may interfere with the driver's observation of objects outside the vehicle can be determined and detected by a camera and can be taken as the partial zone.

In some embodiments, in order to simplify the structural design, the controller is further configured to, render brightness of the display pixel, with the lowest brightness in a first region, in the first region of the display module higher than the brightness of any of display pixels in the second region of the display module when the input image is displayed by the display module.

Non-limitative descriptions are given to the display device provided by the embodiments of the present disclosure in the following with reference to a plurality of examples. As described in the following, in case of no conflict, different features in these specific examples may be combined so as to obtain new examples, and the new examples are also fall within the scope of present disclosure.

Figure 2A:
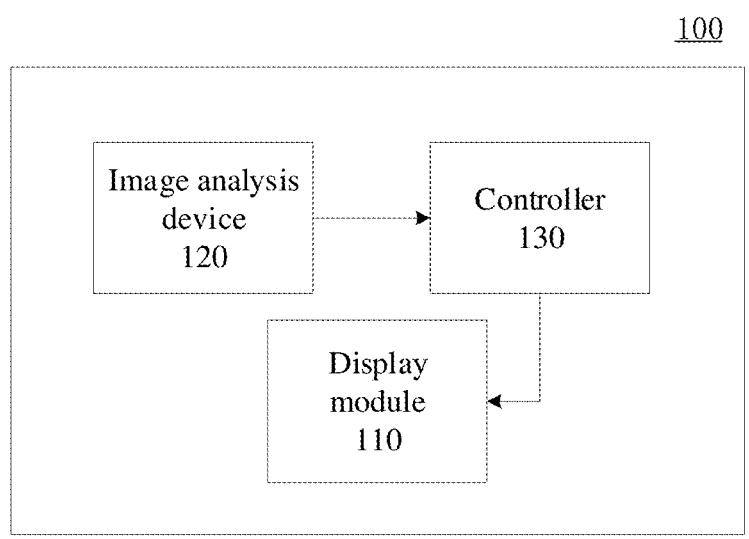
FIG. 2A is an exemplary block diagram illustrating a display device provided by at least one embodiment of the present disclosure.
Figure 2B:
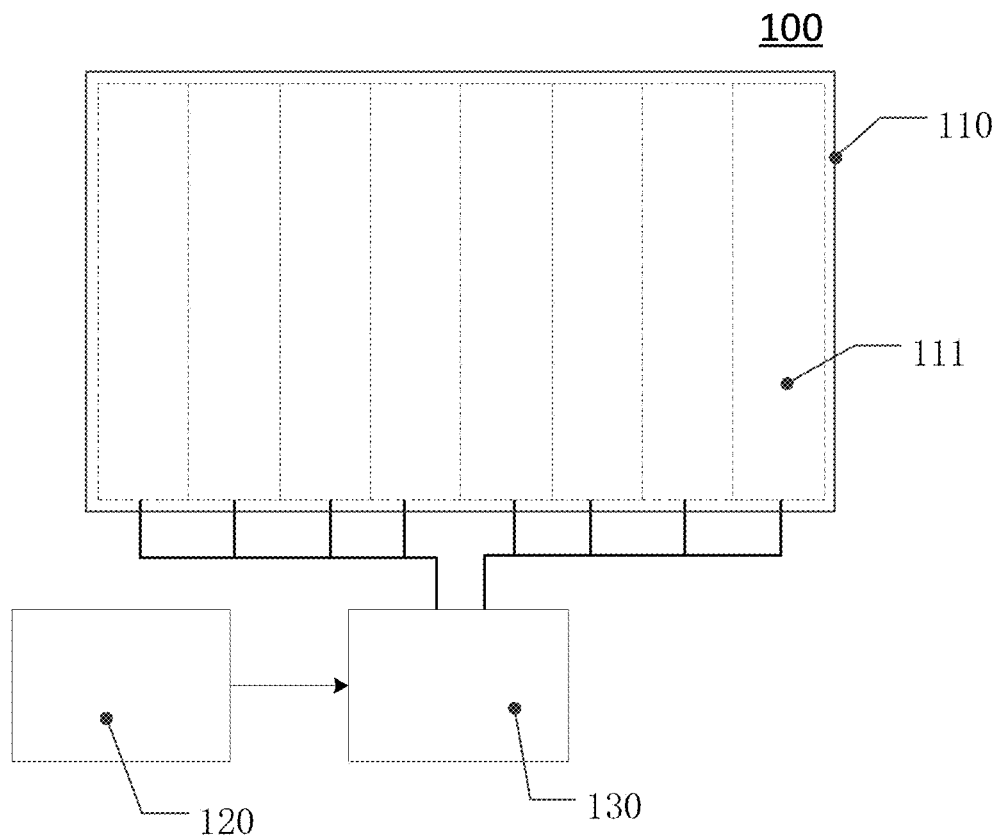
FIG. 2B is a structural diagram exemplarily illustrating the display device illustrated in FIG. 2A.

For example, FIG. 2A and FIG. 2B are respectively an exemplary block diagram and an exemplarily structural diagram of a display device 100 provided by an embodiment of the present disclosure. For example, as illustrated in FIGS. 2A and 2B, the display device 100 includes a display module 110, an image analysis device 120, and a controller 130. For example, the concrete structure of the display module 110, the image analysis device 120 and the controller 130 may be set according to actual application requirements, and embodiments of the present disclosure do not place specific limitation in this respect.

Figure 2C:
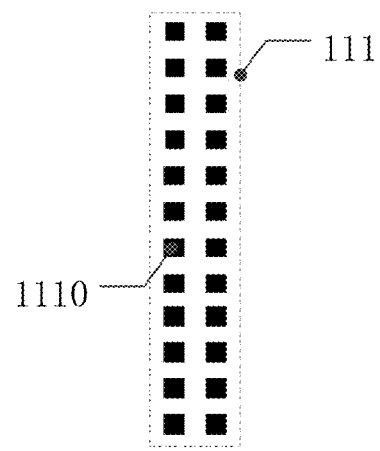
FIG. 2C is a diagram illustrating a display pixel provided by at least one embodiment of the present disclosure.

For example, as illustrated in FIG. 2B, the display module 110 includes a plurality of display subareas 111. For example, as illustrated in FIG. 2C, each of the display subareas 111 may include at least one display pixel 1110. For example, the luminance control method for the plurality of display subareas 111 of the display module 110 may be set according to actual application requirements, and embodiments of the present disclosure do not place specific limitation in this respect. For example, in the case where the display module 110 has a backlight source 160, brightness of the plurality of display subareas 111 may be controlled by adjusting the output light intensity of the region, corresponding to the display subareas 111, of the backlight source 160, but embodiments of the present disclosure are not limited to this case.

Figure 6:
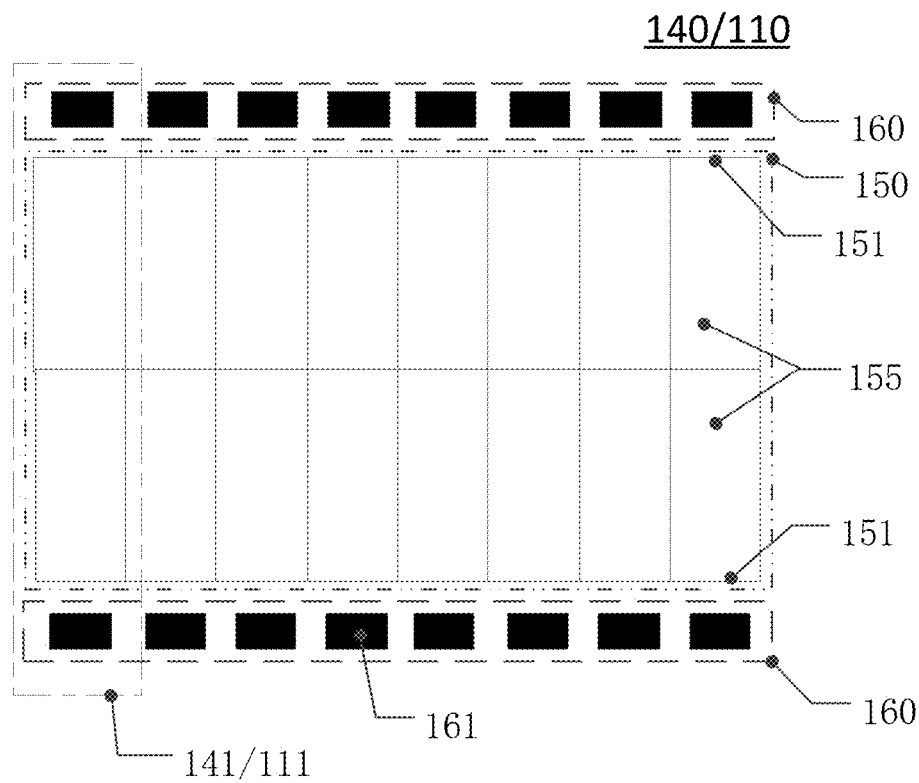
FIG. 6 is a structural diagram exemplarily illustrating still another kind of display module and backlight module provided by at least one embodiment of the present disclosure.

It is to be noted that, the number (i.e., eight) and shape (i.e., rectangle) of the display subareas 111 possessed by the display module 110 as illustrated in FIG. 2B are examples only, and depending on the actual application requirements, the display module 110 may also have more display subareas 111 and/or have display subareas 111 in other shapes. For example, the number and shape of display subareas 111 possessed by the display module 110 may also be the number (i.e., 16) and the shape (i.e., rectangle) of display subareas 111 as illustrated in FIG. 6.

Figure 3A:
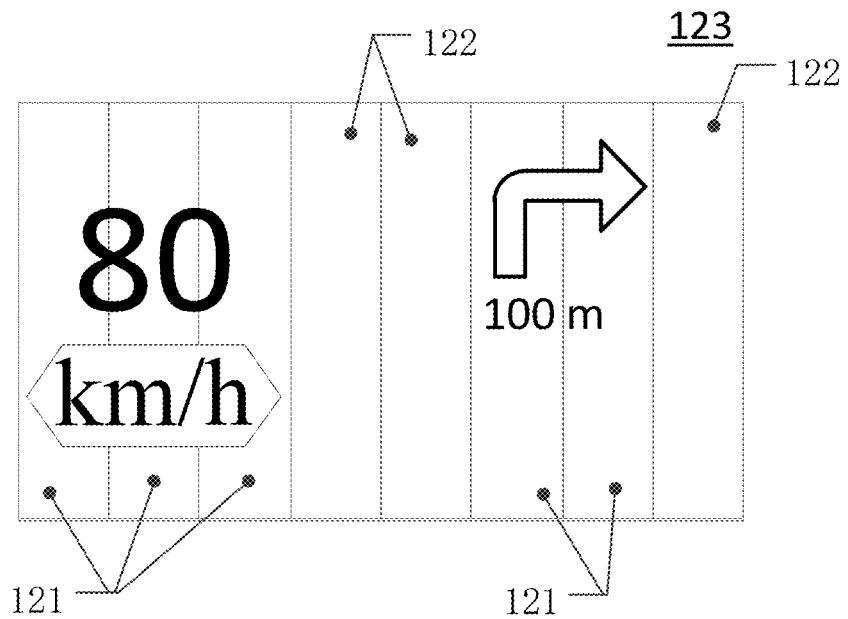
FIG. 3A is a schematic view for illustrating a kind of information zone and non-information zone of an input image provided by at least one embodiment of the present disclosure.
Figure 3B:
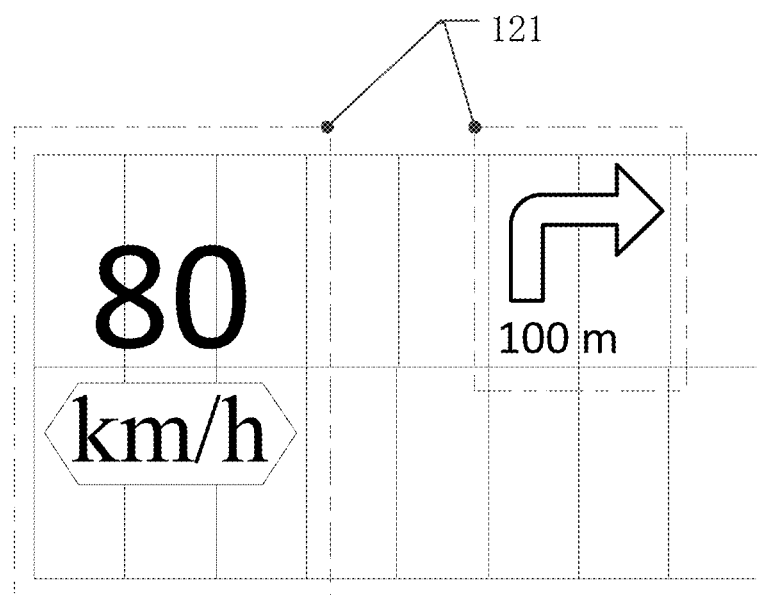
FIG. 3B is a schematic view for illustrating another kind of information zone and non-information zone of an input image provided by at least one embodiment of the present disclosure.

For example, the image analysis device 120 is configured to perform an analysis of an input image (for example, the input image 123 as illustrated in FIGS. 3A and 3B) received by the image analysis device 120, so as to obtain an information zone 121 of the input image and a non-information zone 122 outside the information zone 121. For example, as illustrated in FIGS. 3A and 3B, the information zone 121 of the input image may be such a region of the input image that contains information such as speed information, navigation information and the like, and these information is, for example, text information.

For example, the method for obtaining the information zone 121 of the input image and the non-information zone 122 outside the information zone 121 by the image analysis device 120 may be set according to the actual application requirements, and embodiments of the present disclosure do not place specific limitation in this respect. For example, the information zone 121 and the non-information zone 122 of the input image may be obtained by the following method. Firstly, the input image may be divided into a plurality of image subregions based on the number and shape of the display subareas 111 possessed by the display module 110. The number and shape of the image subregions may, for example, be respectively equal to the number and shape of the display subareas 111 possessed by the display module 110, but embodiments of the present disclosure are not limited to this case. Secondly, texts (for example, the number "80" in FIG. 3A) and symbols (for example, an arrow symbol in FIG. 3A) in the image may be extracted by a feature extraction algorithm. Then, depending on the location of the extracted texts and symbols, it is possible to determine whether any of the plurality of image subregions is an information zone 121 of the input image, or a non-information zone 122 of the input image. For example, as illustrated in FIGS. 3A and 3B, the information zone 121 and non-information zone 122 of the input image illustrated in FIG. 3A and FIG. 3B may be obtained in accordance with the above-mentioned method. For example, the image analysis device 120 may be implemented by a software, firmware, a hardware and any combination thereof, and for example, the hardware form includes FPGA, GPU, DSP, etc. For example, when picture/video information and text/symbol information come from different signal sources, the image analysis device 120 can directly acquire and analyze the text/symbol information source, and obtain the information zone 121 and the non-information zone 122 by taking the display specifications of the display module into consideration.

For example, the controller 130 may be configured to render brightness of a display pixel, with the lowest brightness in a first region (that is, display subareas 111 of the display module 110 corresponding to the information zone 121 of the input image), in the first region of the display module higher than brightness of any of display pixels in a second region (that is, display subareas 111 of the display module 110 corresponding to the non-information zone 122 of the input image) of the display module 110, when the input image is displayed by the display module 110.

The controller 130 may, for example, include a central processing unit (CPU), a microprocessor or other processing circuit having data processing capability and/or instruction executing capability, and the controller 130 cooperates with a corresponding software to achieve functions such as control, processing, and so on. The controller may also control other components (including, but not limited to, a gate driver, a data driver, etc.) in the display device to perform desired functions.

Figure 4A:
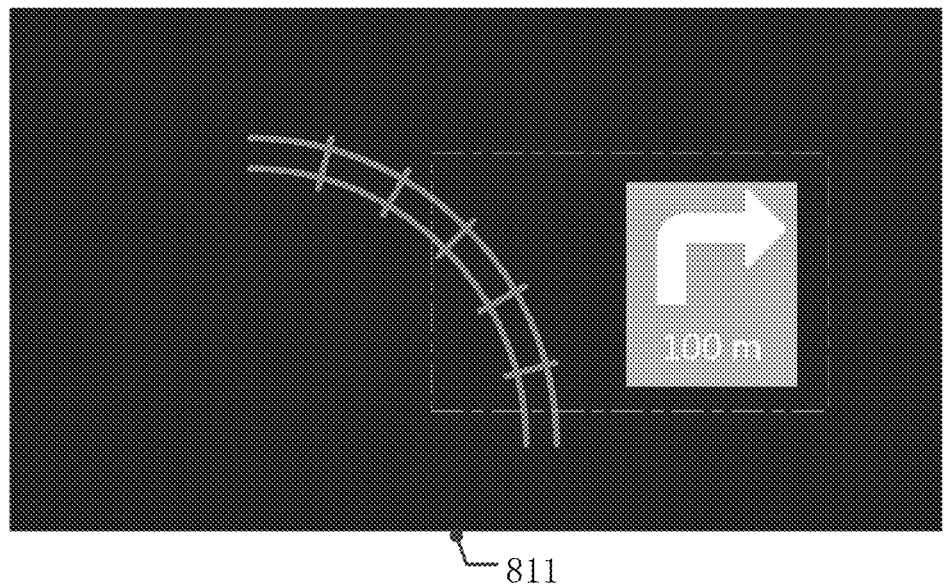
FIG. 4A is a diagram illustrating an application scene of the display device as illustrated in FIG. 2A.
Figure 4B:
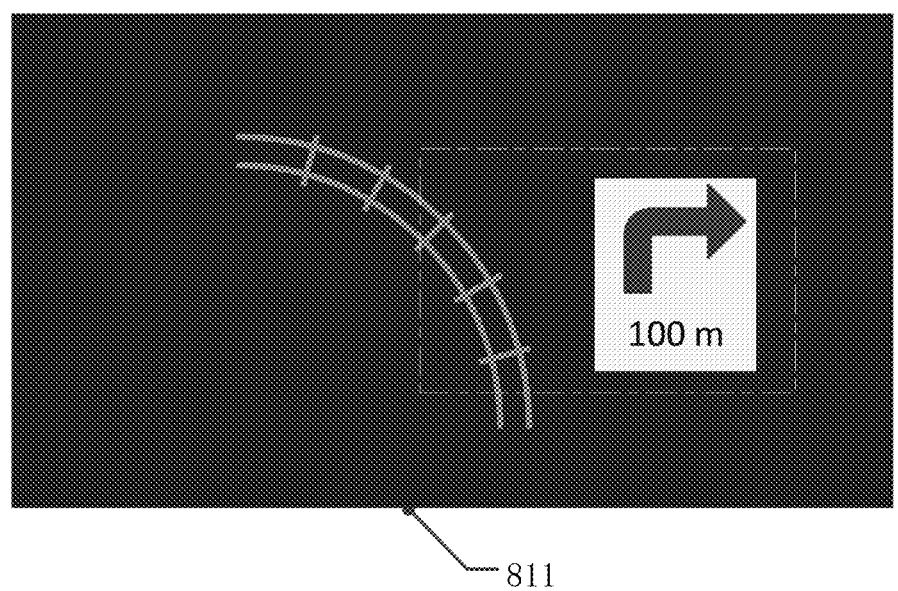
FIG. 4B is a diagram illustrating another application scene of the display device as illustrated in FIG. 2A.

For example, according to actual application requirements, as illustrated in FIGS. 4A and 4B, the controller 130 may be configured to render brightness of display subareas 111 of the display module 110 corresponding to the non-information zone 122 of the input image being zero, when the input image is displayed by the display module, but embodiments of the present disclosure are not limited to this case.

For example, by rendering the brightness of a display pixel, with the lowest brightness in a first region (i.e., the display subareas 111 of the display module 110 corresponding to the information zone 121 of the input image), in the first region of the display module higher than brightness of any of display pixels in a second region (i.e., the display subareas 111 of the display module 110 corresponding to the non-information zone 122 of the input image) of the display module 110, it is possible to reduce the adverse interference of light of the image's non-information zone 122 to the driver in the case where it is guaranteed that the driver can obtain the required information. Thereby, the safety of the vehicle-mounted head-up display system 200 (for example, the vehicle-mounted head-up display system 200) including the display device 100 in use can be promoted.

Figure 5A:
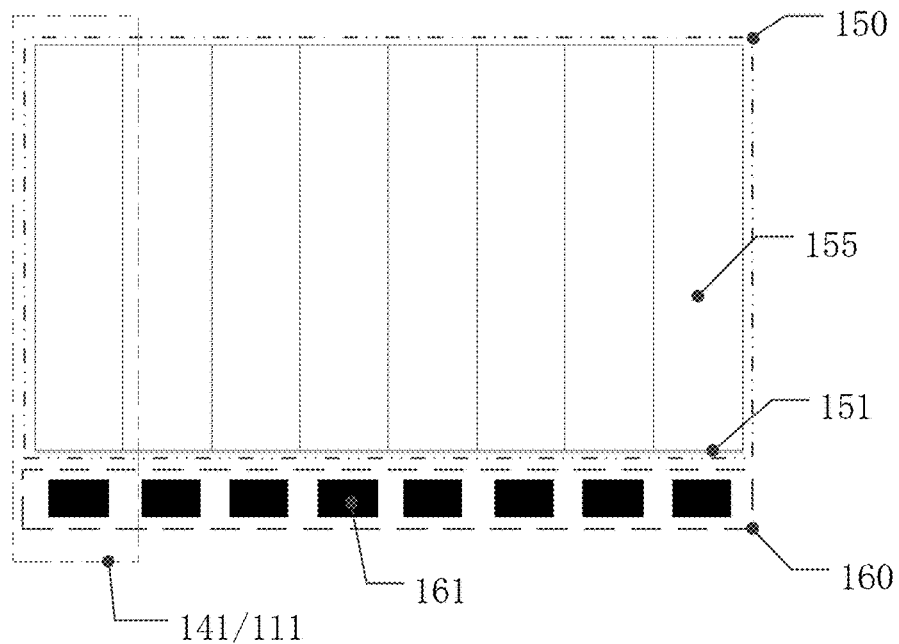
FIG. 5A is a structural diagram exemplarily illustrating a kind of display module and backlight module provided by at least one embodiment of the present disclosure.

For example, as illustrated in FIG. 5A, the display module 110 may include a backlight module 140; and the backlight module 140 includes a plurality of backlight subregions 141 that respectively belong to the plurality of display subareas 111 of the display module 110. For example, the controller 130 may be configured to let backlight subregions 141 corresponding to the information zone 121 have a first light output amount (for example, let the intensity of outgoing light from the backlight subregions 141 corresponding to the information zone 121 be the maximum), and to allow backlight subregions 141 corresponding to the non-information zone 122 to emit no light or to have a second light output amount lower than the first light output amount. Because the intensity of outgoing light from the backlight subregions 141 corresponding to the non-information zone 122 is smaller than the intensity of the outgoing light from the backlight subregions 141 corresponding to the information zone 121, the brightness of the display pixel, with the lowest brightness in the first region (i.e., the display subareas 111 of the display module 110 corresponding to the information zone 121 of the input image), in the first region of the display module is greater than the brightness of any of display pixels in the second region (that is, the display subareas 111 of the display module 110 corresponding to the non-information zone 122 of the input image) of the display module 110.

For example, by means of allowing the backlight subregions 141 corresponding to the non-information zone 122 not to emit light (as understood easily, the case where no light is emitted may be regarded as the second light output amount being zero) or to have the second light output amount, the brightness of the display subareas 111 of the display module 110 corresponding to the non-information zone 122 of the input image can be reduced (for example, the brightness of the display subareas 111 of the display module 110 corresponding to the non-information zone 122 of the input image is made to be zero). Thereby, contrast of the image displayed by the display device 100 can be increased and power consumption of the display device 100 can be reduced. In addition, adverse interference of light corresponding to the image's non-information zone 122 to a driver can also be reduced in the case where it is guaranteed that the driver can obtain the required information.

For example, as illustrated in FIG. 5A, the backlight module 140 may include a light guiding plate 150 and a light source 160 for providing light to the light guiding plate 150. For example, as illustrated in FIG. 5A, the light guiding plate 150 may include a plurality of light guiding regions 155, which respectively belong to the plurality of backlight subregions 141. For example, as illustrated in FIG. 5A, the plurality of light guiding regions 155 may be arranged in a single row, and each of the light guiding regions 155 may include one light-entering face 151. For example, as illustrated in FIG. 5A, the light source 160 includes a plurality of luminous elements 161, which may, for example, be light emitting diodes (inorganic light emitting diodes or organic light emitting diodes). For example, each of the backlight subregions 141 may include at least one of the luminous elements 161; and for example, at least one of the luminous elements 161 is provided corresponding to the light-entering face 151 of each of the light guiding regions 155, and the light-entering face 151 of the light guiding regions 155 may, for example, be at least partial region of a side surface of the light guiding plate.

For example, the controller 130 may be configured to allow the luminous elements 161 in backlight subregions 141 corresponding to the information zone 121 to be in a turned-on state (for example, in an optical state corresponding to the first light output amount), so that the backlight subregions 141 corresponding to the information zone 121 has the first light output amount, and the controller 130 is also configured to allow the luminous elements 161 in the backlight subregions 141 corresponding to the non-information zone 122 in a turned-off state or in a luminance reduced state, so that the backlight subregions 141 corresponding to the non-information zone 122 does not emit light or has the second light output amount lower than the first light output amount.

Figure 7A:
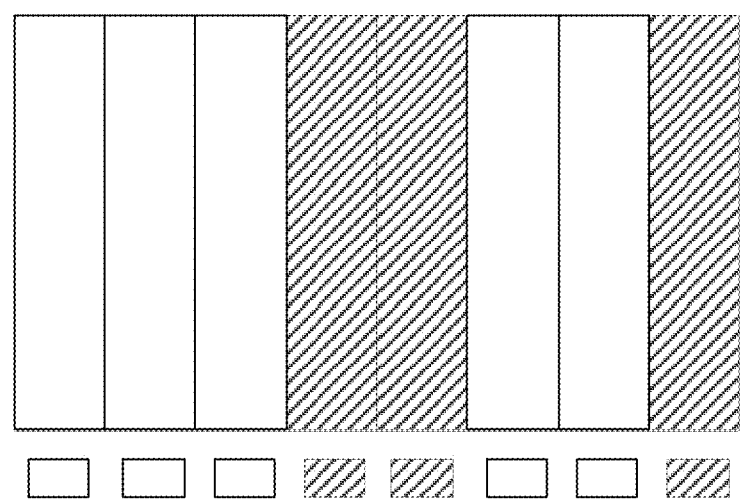
FIG. 7A is a schematic view for illustrating a state of luminous elements provided by at least one embodiment of the present disclosure.

For example, as illustrated in FIG. 7A, for the input image as illustrated in FIG. 3A, the luminous elements 161 in the first to third columns and in the sixth to seventh columns (from left to right) may be in a turned-on state, and the luminous elements 161 in the fourth column, the fifth column and the eighth column (from left to right) are in a turned-off state or in a luminance reduced state. Thereby, it is possible that the backlight subregions 141 corresponding to the information zone 121 are made to have the first light output amount, and the backlight subregions 141 corresponding to the non-information zone 122 are made to emit no light or to have the second light output amount lower than the first light output amount. Therefore, the brightness of the display subareas 111 of the display module 110 corresponding to the non-information zone 122 of the input image can be reduced (see FIG. 7C).

Figure 7B:
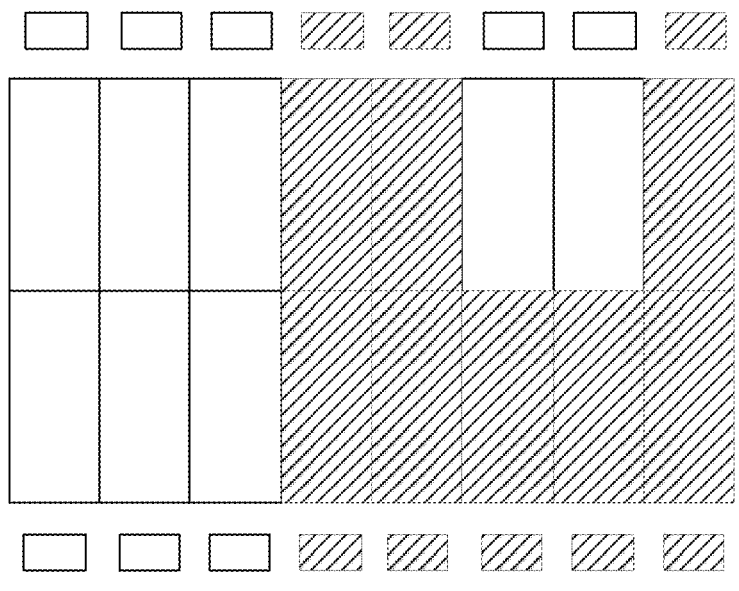
FIG. 7B is a schematic view for illustrating another state of luminous elements provided by at least one embodiment of the present disclosure.
Figure 7B:
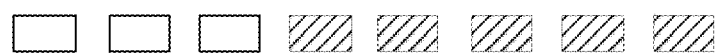
Figure 7C:
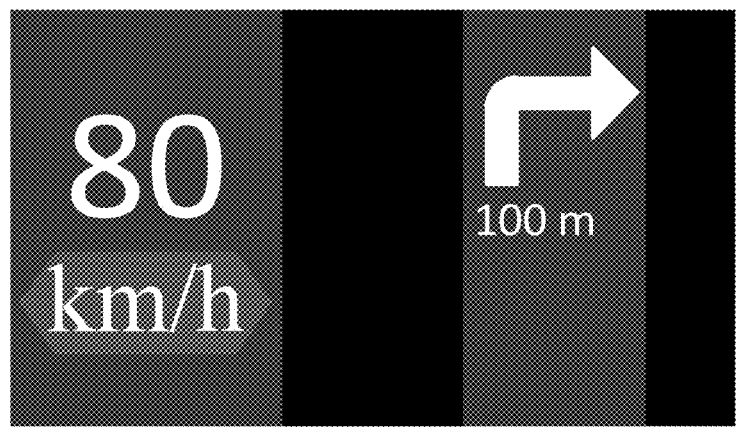
FIG. 7C is an image displayed by the display device as illustrated in FIG. 7A.
Figure 7D:
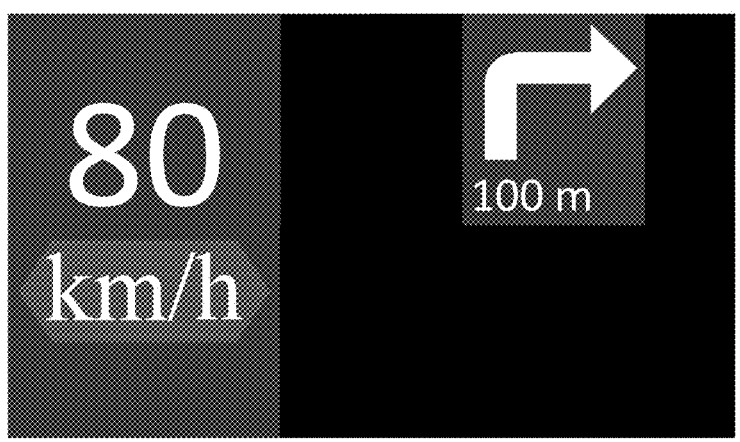
FIG. 7D is an image displayed by the display device as illustrated in FIG. 7B.

For example, as illustrated in FIG. 7B, for the input image as illustrated in FIG. 3B, the luminous elements 161 in the following places may be in a turned-off state or in a luminance reduced state: the fourth, fifth and eighth columns in the first row (from left to right) and the fourth to eighth columns in the second row (from left to right), and the luminous elements 161 at the remaining location are in a turned-on state. Thereby, it is possible that the backlight subregions 141 corresponding to the information zone 121 are made to have the first light output amount, and the backlight subregions 141 corresponding to the non-information zone 122 are made to emit no light or to have the second light output amount lower than the first light output amount. Therefore, the brightness of the display subareas 111 of the display module 110 corresponding to the non-information zone 122 of the input image can be reduced (see FIG. 7D).

For example, by means of allowing the luminous elements 161 of the backlight subregions 141 corresponding to the information zone 121 in a turned-on state, and allowing the luminous elements 161 of the backlight subregions 141 corresponding to the non-information zone 122 in a turned-off state or in a luminance reduced state, the backlight subregions 141 corresponding to the information zone 121 can be made to have the first light output amount, and the backlight subregions 141 corresponding to the non-information zone 122 can be made to emit no light or to have the second light output amount lower than the first light output amount. Therefore, the brightness of the display subareas 111 of the display module 110 corresponding to the non-information zone 122 of the input image can be reduced. In this way, the brightness of the display pixel, with the lowest brightness in the first region (i.e., the display subareas 111 of the display module 110 corresponding to the information zone 121 of the input image), in the first region of the display module can be made to be higher than the brightness of any of display pixels in the second region (i.e., the display subareas 111 of the display module 110 corresponding to the non-information zone 122 of the input image) of the display module 110, and then, the contrast of the image displayed by the display device 100 can be promoted and the power consumption of the display device 100 can be reduced. Furthermore, the adverse interference of the light corresponding to the image's non-information zone 122 to a driver can be reduced in the case where it is guaranteed that the driver can obtain the required information.

Figure 5B:
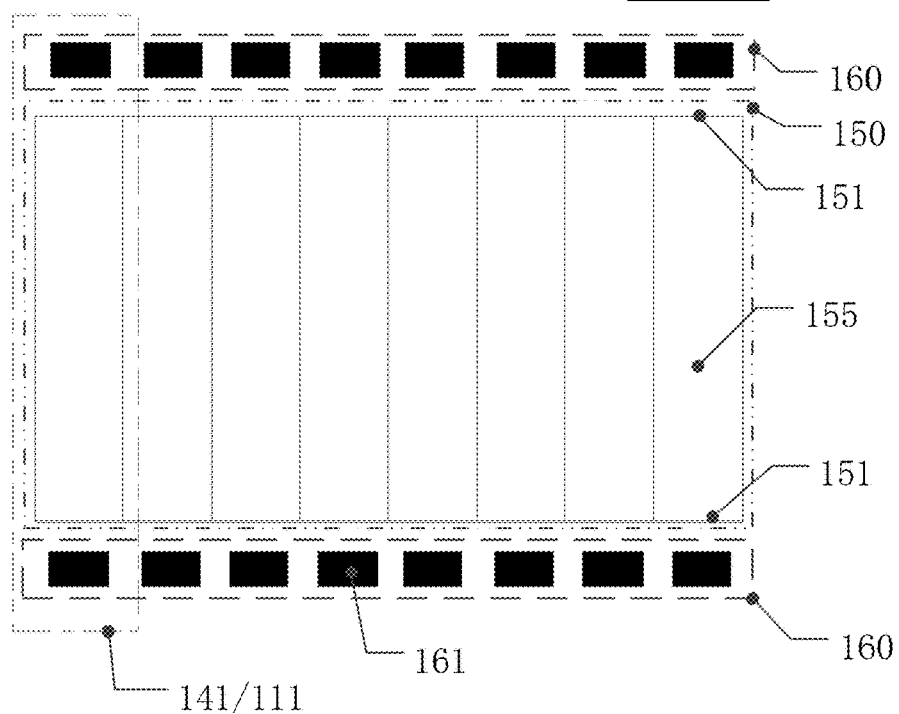
FIG. 5B is a structural diagram exemplarily illustrating another kind of display module and backlight module provided by at least one embodiment of the present disclosure.

For example, in the case where the plurality of light guiding regions 155 can be arranged in a single row, each of the light guiding regions 155 is not limited to have only one light-entering face 151 (see FIG. 5A), and as illustrated in FIG. 5B, each of the light guiding regions 155 may also include two light-entering faces 151 (see FIG. 5B). In this case, the backlight region may include two rows of luminous elements 161.

For example, the plurality of light guiding regions 155 included in the light guiding plate 150 are not limited to be arranged in a single row (see FIG. 5A and FIG. 5B), and according to practical application requirements, the plurality of light guiding regions 155 included in the light guiding plate 150 can also be arranged in two rows (see FIG. 6). The backlight modules as illustrated in FIG. 5A, FIG. 5B and FIG. 6 are of side-entering type, namely, the luminous elements 161 are arranged on a side of the light guiding plate, but embodiments of this disclosure are not limited to this case. For example, in another embodiment according to the present disclosure, the backlight module is of direct-light type, and in this case, the backlight module may include a light source (e.g., a plurality of luminous elements), a diffusing plate, an optical film, and so on that are sequentially arranged in the direction perpendicular to the backlight module. As compared to the plurality of luminous elements, the diffusing plate is closer to the light exiting side of the backlight module. The plurality of luminous elements may be distributed in different backlight regions, and the luminous brightness of the plurality of luminous elements may be controlled independently.

It is to be noted that, in FIG. 5A, FIG. 5B and FIG. 6, a black solid line between adjacent light guiding regions 155 is used only to indicate the boundary of the light guiding regions 155, and does not mean that there is an interface between adjacent light guiding regions 155. For example, the plurality of light guiding regions 155 may be formed integrally and there is no interface between the plurality of light guiding regions 155. For another example, the plurality of light guiding regions 155 may also be formed separately, and then combined into a single light guiding plate 150. In this case, an interface exists between adjacent light guiding regions 155.

Figure 8:
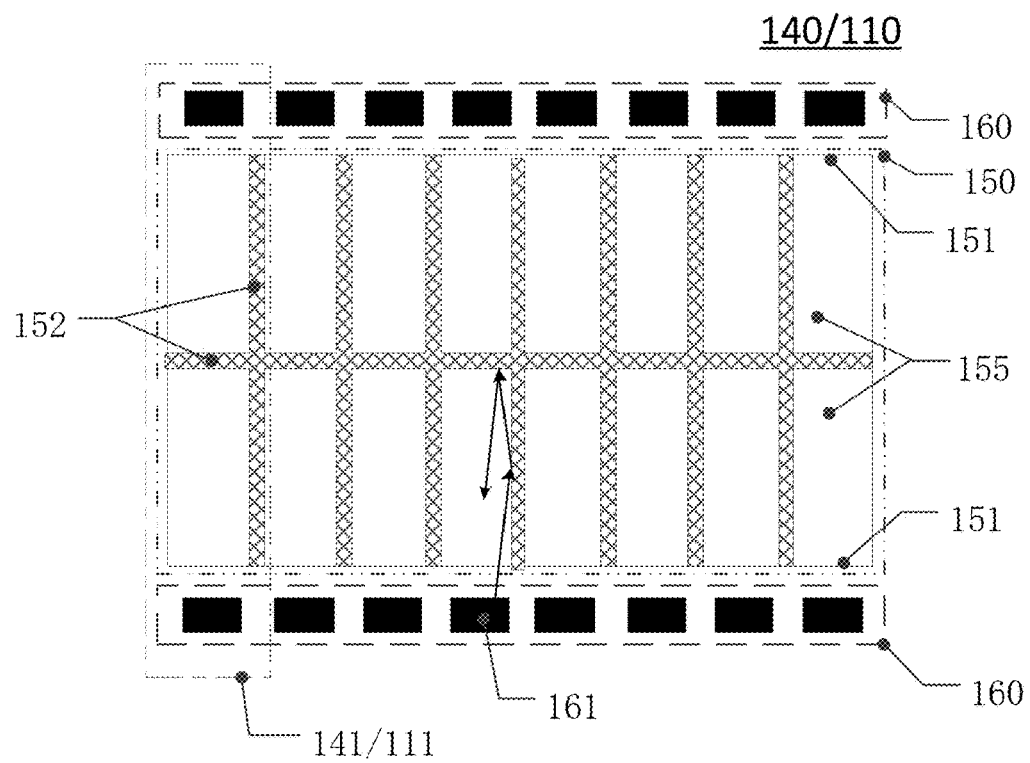
FIG. 8 is a structural diagram exemplarily illustrating yet still another kind of display module and backlight module provided by at least one embodiment of this disclosure.

For example, as illustrated in FIG. 8, in the case where the plurality of light guiding regions 155 are formed separately, the light guiding plate 150 may further include a light blocking structure 152, and the light blocking structure 152 is formed on an interface between adjacent light guiding regions 155. For example, the light blocking structure 152 can block light from entering an adjacent light guiding region 155, and thus optical crosstalk can be prevented from occurring between adjacent light guiding regions 155. For example, the light blocking structure 152 may be a reflective structure, and thereby the light blocking structure 152 can reflect light that is incident on the light blocking structure 152 back into a light guiding region 155 in which the light is originated. In this case, not only optical crosstalk can be prevented, but also the utilizing efficiency of light can be improved. For example, the reflective structure may be implemented in a plurality of forms, and for example, a reflecting layer may be formed on or a reflector may be attached to the side surface of each independent light guiding region 155. The reflecting layer is, for example, a metal coating or a plastic coating, and the reflector comprises, for example, a metal sheet or a plastic sheet.

Figure 9A:
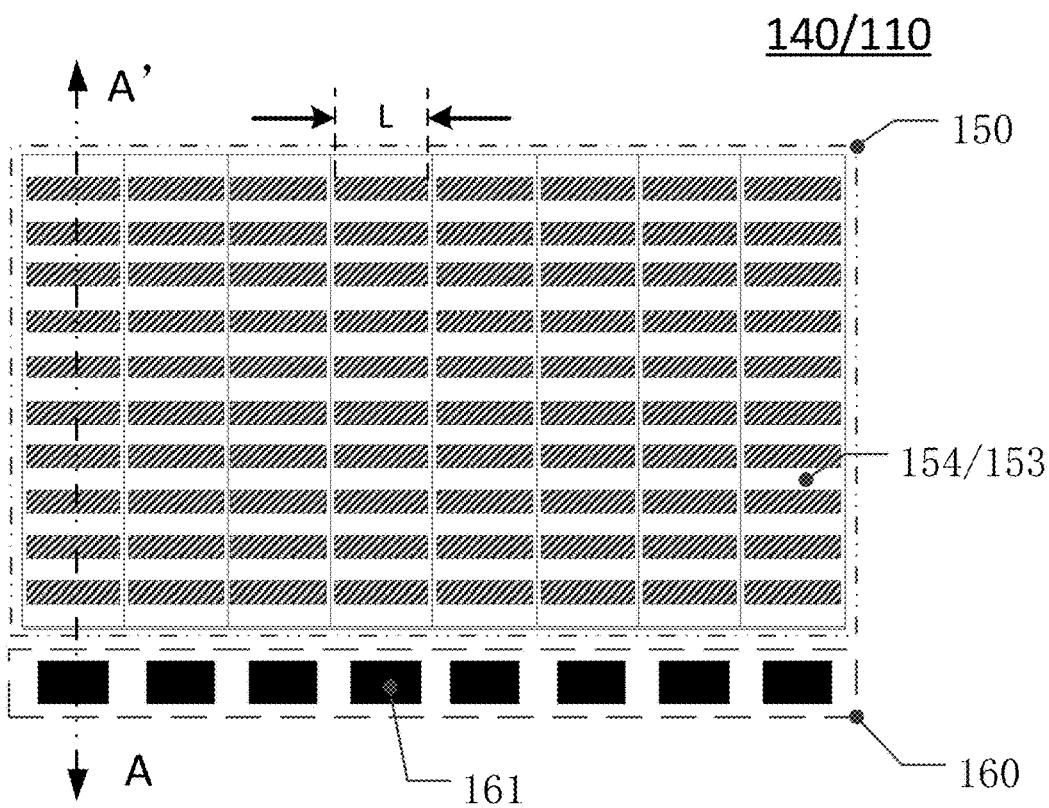
FIG. 9A is an exemplary plan view illustrating yet still another kind of display module and backlight module provided by at least one embodiment of this disclosure.
Figure 9B:
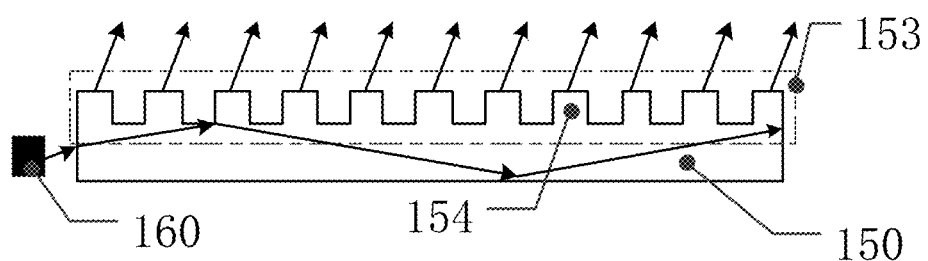
FIG. 9B is a sectional view exemplarily illustrating the display module and the backlight module as illustrated in FIG. 9A.

For example, FIG. 9A and FIG. 9B are respectively a schematic plan view and a schematically sectional view of a backlight module 140. The schematically sectional view as illustrated in FIG. 9B is obtained through sectioning along the line A-A' of the backlight module 140 as illustrated in FIG. 9A. For example, as illustrated in FIG. 9A, the light guiding plate 150 may further include a light outputting structure 153 arranged on the light exiting face of the light guiding plate 150 according to the actual application requirements. The light outputting structure 153 may be configured to allow the light propagated in the light guiding plate 150 to leave the light guiding plate 150 with a predetermined angle, and thus, adverse impact of the light emitted from the backlight subregion 141 in one of the display subareas 111 on an adjacent display subarea 111 can be prevented. For example, the light outputting structure 153 may be configured to allow the light propagated in the light guiding plate 150 to leave the light guiding plate 150 in the direction perpendicular to the light guiding plate 150.

For example, the light outputting structure 153 may include a plurality of light guiding patterns (e.g. grating stripes 154) that are spaced apart, and the light outputting structure 153 may, for example, be a diffraction grating, but embodiments of the present disclosure are not limited to this case. For example, the light guiding patterns (e.g., the grating stripes 154) may be produced in such a way that a laser (e.g., a carbon dioxide laser; the repetitive frequency of the laser is 25 kHz, and the power of the laser is 55 W) is used to cut grooves on the light-exiting face of the light guiding plate 150, but embodiments of the present disclosure are not limited to this case. For example, the length L, the width W and the depth H of the grating stripe 154 may be 1000 microns, 150 microns, and 600 microns, respectively, but embodiments of this disclosure are not limited to this case. For example, the backlight module 140 may further include an optical element for collimation arranged between the luminous elements 161 (the light source 160) and the light guiding plate 150 according to practical application requirements. For example, the divergence angle of the light provided by the luminous elements 161 may be reduced by the optical element for collimation; and for example, the optical element for collimation enables the light that is incident onto the light-entering face 151 of the light guiding plate 150 to be a collimated light, but embodiments of the present disclosure are not limited to this case.

For example, the light outputting structure 153 enables the light emitted from the light guiding plate 150 to be well collimated. For example, the angle γ' between the light emitted from the light guiding plate 150 and the normal line t of the light-exiting face of the light guiding plate 150 satisfies the following equation, that is, n×sin γ−n 1×sin γ'=m×λ/P, here n is the refractive index of the light guiding plate 150, n1 is the refractive index of a medium (e.g., air), in which the light propagated in the light guiding plate 150 enters into the medium after the light leaves the light guide plating 150, γ is the angle between the light propagated in the light guiding plate 150 and the normal line t of the light-exiting face of the light guiding plate 150, m is the order of the diffracted light generated by the light outputting structure 153 and may be an integer, and P is the spacing between adjacent light guiding patterns (for example, the spacing between center lines of adjacent grating stripes 154 in the arranging direction of the grating stripes 154). For example, for incident light with the same wavelength, when the angles of the light that is incident onto the light-exiting face of the light guiding plate 150 are all γ, the light emitted from the light-exiting face of the light guiding plate 150 leaves the light guiding board 150 with the same angle, and therefore, the light outputting structure 153 enables the light emitted from the light guiding plate 150 to be well collimated. In view of this, the adverse impact of the light emitted from the backlight subregion 141 in one of the display subareas 111 on an adjacent display subarea 111 can be avoided. Therefore, the contrast of an image displayed by the display device 100 can be further enhanced.

Figure 10A:
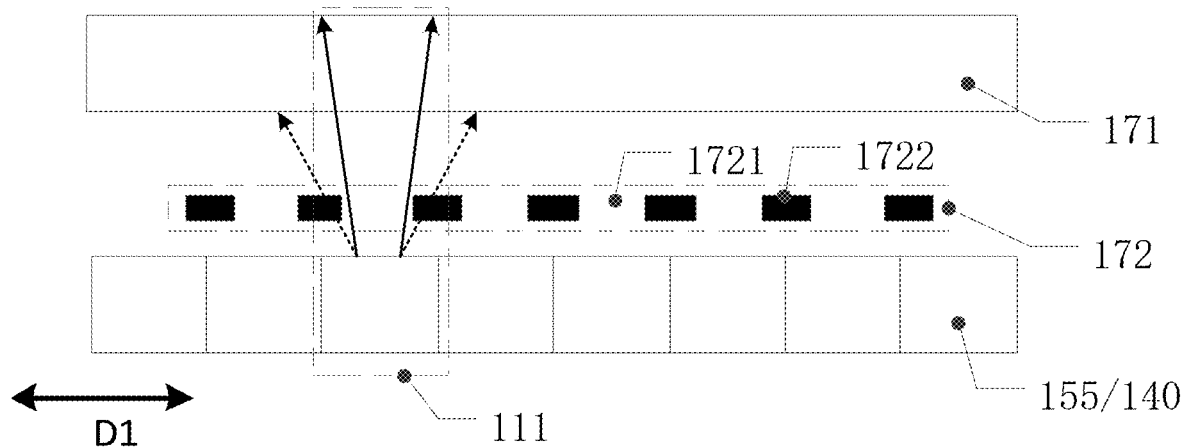
FIG. 10A is an exemplary plan view illustrating yet still another kind of display module and backlight module provided by at least one embodiment of this disclosure.

For example, as illustrated in FIG. 10A, the display device 100 may further include a display panel (e.g., a liquid crystal panel 171) and a light shading layer 172. For example, the light shading layer 172 may be arranged between the liquid crystal panel 171 and the backlight module 140, and may be configured to reduce the divergence angle of the light that is incident on the liquid crystal panel 171. Thus, it is possible to reduce the adverse effect of the light emitted from the backlight subregion 141 in one of the display subareas 111 on a display module 110 located in an adjacent display subarea 111, and therefore, the contrast of an image displayed by the display device 100 can be further enhanced.

For example, the light shading layer 172 may include light transmissive zones 1721 and light shading zones 1722 for separating the light transmissive zones 1721; and the light shading zones 1722 partially overlap with the orthographic projection of each of the light guiding regions 155 on the light shading layer 172. The orthographic projection of an edge, which is adjacent to other light guiding region 155, of any light guiding region 155 on the light shading layer 1722 is completely covered by the light shading zones 1722.

In conjunction with FIGS. 10A and 10B, an exemplary description will be given regarding the specific setting mode of the light shading layer 172 according to an embodiment of the present disclosure with reference to an example in which the plurality of light guiding regions are arranged in two rows. It is to be noted that, the light shading layer in FIG. 10A may be obtained by sectioning along the line B-B' of FIG. 10B.

Figure 10B:
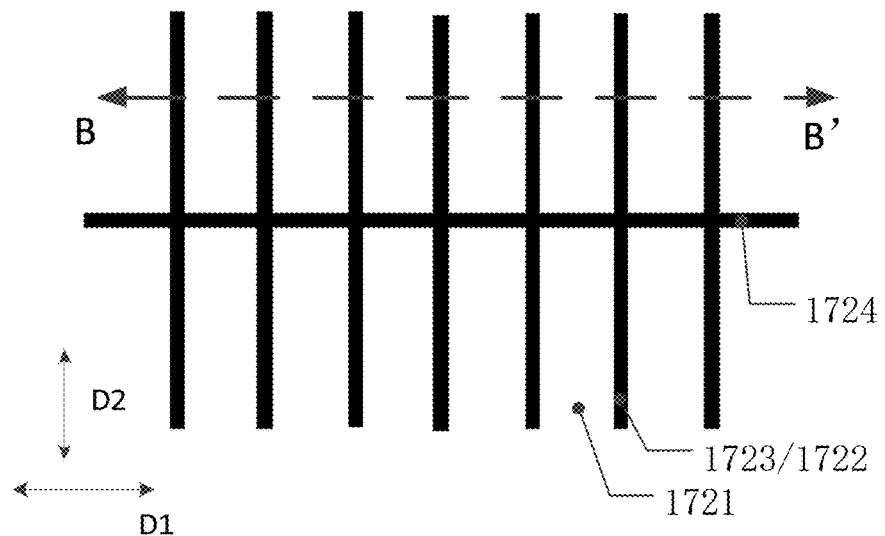
FIG. 10B is an exemplary plan view illustrating a light shading layer provided by at least one embodiment of the present disclosure.

For example, as illustrated in FIG. 10B, the plurality of light guiding regions 155 located in the first row and the plurality of light guiding regions 155 located in the second row are respectively arranged along a first direction D1. A light shading zone 1722 of the light shading layer 172 may include a plurality of first shading stripes 1723 arranged in the first direction D1, and the first light shading stripes 1723 extend in a second direction D2 intersecting (e.g. perpendicular to) the first direction D1. The orthographic projection of the edges, that are in direct contact, of light guiding regions 155 that are adjacent in the first direction D1 on the light shading layer 172 may be completely covered by the first light shading stripes 1723, but embodiments of this disclosure are not limited to this case.

For example, as illustrated in FIG. 10B, the light shading zone 1722 of the light shading layer 172 may further include a second light shading stripe 1724 extending in the first direction D1; and the orthographic projection of the edges, which is in direct contact with the edges of the plurality of light guiding regions 155 located in the second row, of the plurality of light guiding regions 155 located in the first row and the edges, which is in direct contact with the edges of the plurality of light guiding regions 155 located in the first row, of the plurality of light guiding regions 155 located in the second row on the second light shading stripe 1724 may be completely covered by the second light shading stripe 1724. However, embodiments of the present disclosure are not limited to this case. For example, the first light shading stripe 1723 and the second light shading strip 1724 may be formed integrally, but embodiments of this disclosure are not limited to this case.

Figure 9C:
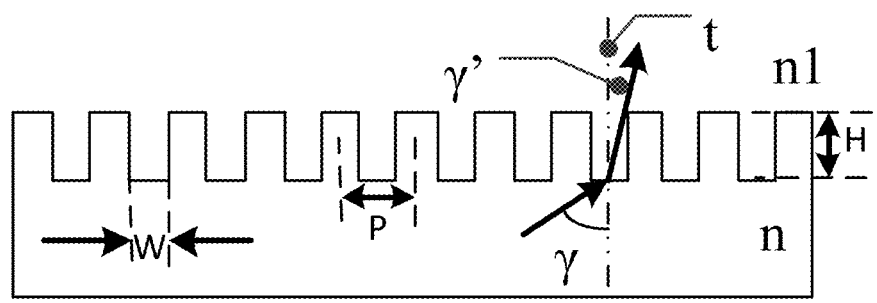
FIG. 9C is a sectional view exemplarily illustrating a light guiding plate included in the backlight module as illustrated in FIG. 9A.

It is to be noted that, the display module 110 as illustrated in FIG. 9A to FIG. 9C may also be provided with the liquid crystal panel 171 and the light shading layer 172, according to the actual application requirements. By provision of the light shading layer 172, the light incident on the light-entering face of the light guiding plate 150 are enabled to have a certain divergence angle, and thereby design freedom of the display module 110 as illustrated in FIG. 9A to FIG. 9C can be promoted.

In an embodiment of the present disclosure, appropriate regions may be selected as the information zone and the non-information zone based on the type of the display panel, the type of the backlight, and other traits.

For example, for active type (self-luminous type) light emitting display panels such as an OLED (organic light emitting diode display panel), a QLED (quantum dot light emitting diode display panel), a Mini LED (submillimeter light emitting diode), a Micro LED (micro light emitting diode) or the like, a region, which contains semantics (such as texts, icons, charts, etc.), of an input image may be selected as the information zone at least, for controlling brightness of pixels in the information zone and non-information zone when the display module performs display function. As understood easily, for active type (self-luminous type) light emitting display panels, a region, which contains semantics (such as texts, icons, charts, etc.), of an input image may also be selected as the information zone, for example, a rectangular region, a circular region or the like including texts, icons, charts and other semantics may be selected as the information zone.

For example, for a liquid crystal display panel with a backlight, a suitable information zone may be selected according to the type of its backlight. For a liquid crystal display panel with a direct-light type backlight, a region, which contains semantics, of an input image (e.g., texts, icons, charts, etc.), such as a rectangular region, may be selected as an information zone, and the brightness of the information zone and the non-information zone can be adjusted by controlling corresponding regions of the backlight. In a liquid crystal display panel with a side-entering type backlight, a rectangular region, that extends along and a vertical or horizontal direction and contains semantics (e.g., texts, icons, charts, etc.), of an input image may be selected as an information zone in accordance with the position of the side-entering type backlight source. For example, as for the case where the backlight source is located at the upper side or the lower side of a display device and arranged along the horizontal direction, a rectangular region, that extends along the vertical direction and contains semantics (e.g., texts, icons, charts, etc.) of an input image is selected as an information zone. For example, as for the case where the backlight source is located at the left side or the right side of a display device and arranged along the vertical direction of a display device, a rectangular region, that extends along the horizontal direction and contains semantics (e.g., texts, icons, charts, etc.), of an input image may be selected as an information zone. For example, as for the case where the backlight source is located at the left side or the right side of a display device and arranged along the vertical direction (or at the upper side or the lower side of a display device and arranged along the horizontal direction), at least half of a rectangular region, that extends along the horizontal direction and contains semantics (e.g., texts, icons, charts, etc.), of an input image or at least half of a rectangular region, that extends along the vertical direction and contains semantics (e.g., texts, icons, charts, etc.) of an input image may be selected as an information zone.

At least one embodiment of the present disclosure further provides a head-up display system, which comprises any of the display devices provided by embodiments of the present disclosure.

Figure 11:
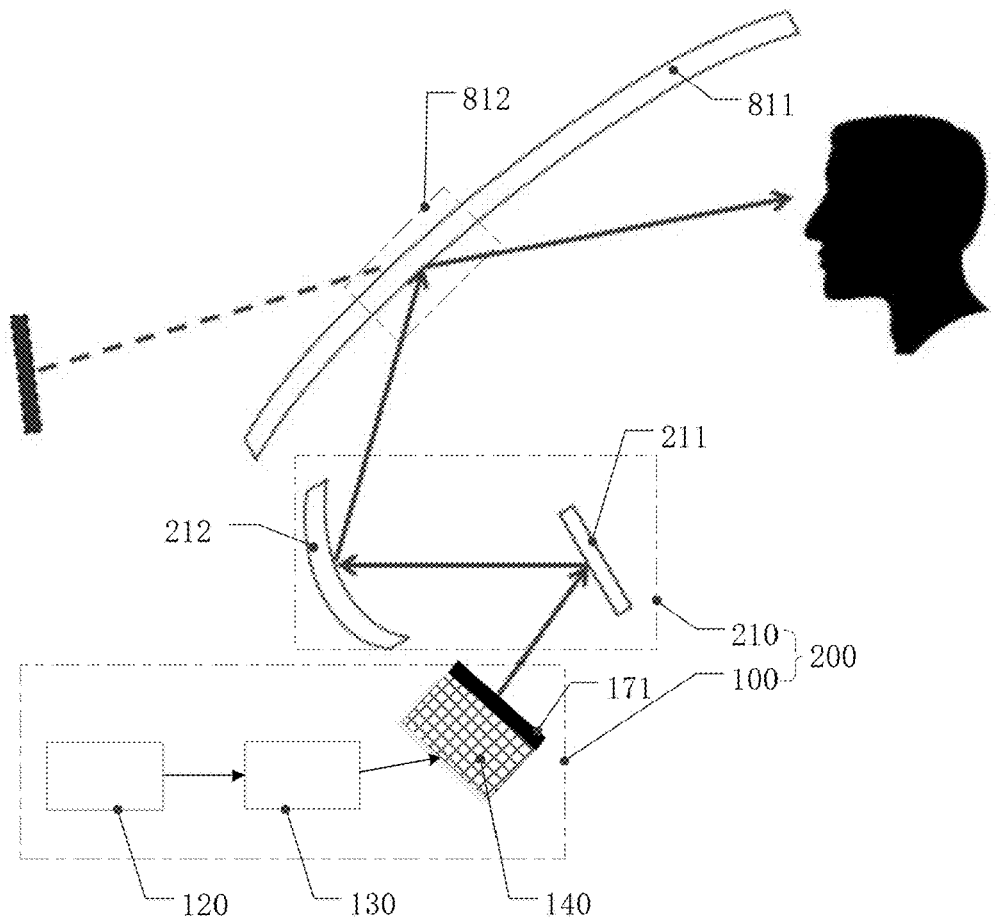
FIG. 11 is a structural diagram exemplarily illustrating a head-up display system provided by at least one embodiment of the present disclosure.

FIG. 11 is a head-up display system 200 provided by at least one embodiment of the present disclosure. For example, as illustrated in FIG. 11, the display device 100 may include a backlight module 140 and a liquid crystal panel 171, but embodiments of this disclosure are not limited to this case.

For example, as illustrated in FIG. 11, the head-up display system 200 may further include an image projecting structure 210 configured, for example, to transmit an image displayed by the display device 100 to the viewing position of a user. For example, concrete structure of the image projecting structure 210 may be set according to practical application requirements, and for example, the image projecting structure 210 may include a lens, a plane or curved mirror, etc., which are not specifically defined in embodiments of the present disclosure. For example, as illustrated in FIG. 11, the image projecting structure 210 includes a plane mirror 211 and a concave mirror 212 arranged in the propagation path of the displayed image. The plane mirror 211 may be configured to reflect the light of the displayed image received by the plane mirror 211 onto the concave mirror 212; and the concave mirror 212 may be configured to reflect the light of the displayed image onto a car window 811 (front windshield) (e.g. an image displaying area on the car window 811). The car window 811 can reflect the light of the displayed image to the viewing position of the user (e.g., a driver), and the driver can see, for example, an upright virtual image standing.

For example, as illustrated in FIG. 11, the display device 100 may further include a controller 130 and an image analysis device 120. For example, by means of acquiring an information zone 121 of an input image and a non-information zone 122 outside the information zone 121 with use of the image analysis device 120, and by way of making the brightness of the display pixel, with the lowest brightness in a first region (the display subareas 111 of the display module 110 corresponding to the information zone 121 of the input image), in the first region of the display module be higher than brightness of any of display pixels in a second region (that is, the display subareas 111 of the display module 110 corresponding to the non-information zone 122 of the input image) of the display module 110, the adverse interference of the light corresponding to the image's non-information zone 122 to the driver can be reduced in the case where ability to acquire the required information is guaranteed. Thereby, the safety of the head-up display system 200 (for example, a vehicle-mounted head-up display system 200) including the display device 100 in use can be promoted.

Figure 12:
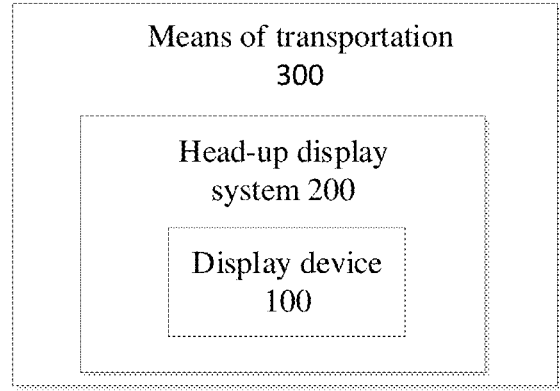
FIG. 12 is an exemplary block diagram illustrating a means of transportation provided by at least one embodiment of the present disclosure.

At least one embodiment of the present disclosure further provides a means of transportation, which comprises any of display devices or any of head-up display systems provided by embodiments of the present disclosure. For example, FIG. 12 is an exemplary block diagram illustrating a means of transportation 300 provided by at least one embodiment of the present disclosure. For example, as illustrated in FIG. 12, the means of transportation 300 may include any of display devices 100 or any of head-up display systems 200 provided by embodiments of this disclosure. The means of transportation may, for example, be a car, boat, train, etc., and the above head-up display system may be arranged in a driving cab or cockpit of the means of transportation.

For example, by means of acquiring an information zone 121 of an input image and a non-information zone 122 outside the information zone 121 with use of the image analysis device 120, and by way of making the brightness of the display pixel, with the lowest brightness in a first region (namely, the display subareas 111 of the display module 110 corresponding to the information zone 121 of the input image), in the first region of the display module be higher than brightness of any of display pixels in a second region (that is, the display subareas 111 of the display module 110 corresponding to the non-information zone 122 of the input image) of the display module 110, the adverse interference of the light corresponding to the image's non-information zone 122 to the driver can be reduced in the case where ability to acquire the required information is guaranteed. Thereby, the safety of the head-up display system 200 (for example, a vehicle-mounted head-up display system 200)

including the display device 100 in use and the means of transportation 300 can be promoted.

It is to be noted that, as for other essential parts of the display device 100, the head-up display system 200 and the means of transportation 300 (e.g., signal encoding/decoding circuits, an electric source, etc.), applicable conventional components may be adopted. These should be understood by those ordinarily skilled in the art, and will not be specified here, and they shall not be construed as limitation of the present disclosure.

Figure 13:
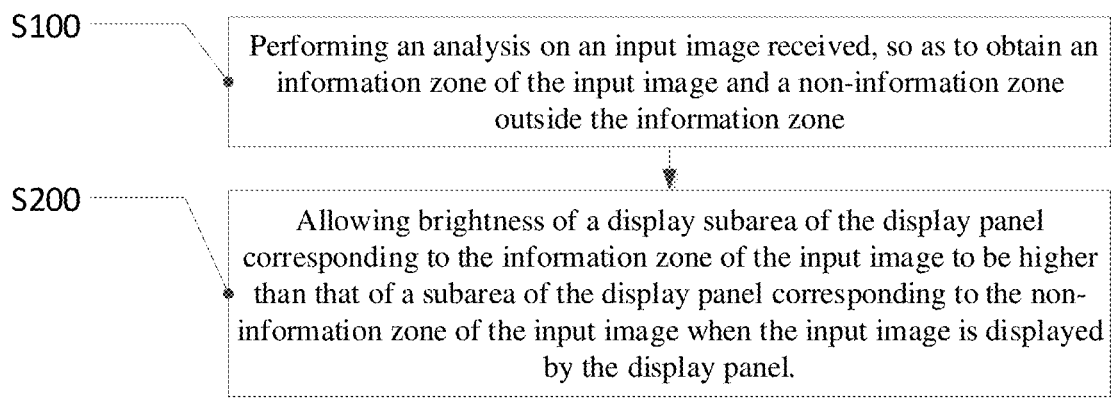
FIG. 13 is an exemplary flowchart illustrating a display method provided by at least one embodiment of the present disclosure.

At least one embodiment of the present disclosure also provides a display method (see FIG. 13), which includes the following steps.

Step S100: performing an analysis on an input image received, so as to obtain an information zone of the input image and a non-information zone outside the information zone.

Step S200: allowing the brightness of a display pixel, with the lowest brightness in a first region, in the first region of the display module to be higher than the brightness of any of display pixels in a second region of the display module when the input image is displayed using a display module, here, the first region of the display module is a display subarea of the display module corresponding to the information zone of the input image, and the second region of the display module is a display subarea of the display module corresponding to the non-information zone of the input image.

For example, in the step S100, regarding the specific method for obtaining the information zone of the input image and the non-information zone outside the information zone by means of performing an analysis of the input image received, reference may be made to the embodiment of the display device of the present disclosure, and no further description will be given here.

For example, by way of making the brightness of a display pixel, with the lowest brightness in a first region (i.e. a display subarea of the display module corresponding to the information zone of the input image), in the first region of the display module be higher than brightness of any of display pixels in a second region (that is, a display subarea of the display module corresponding to the non-information zone of the input image) of the display module 110, it the adverse interference of the light corresponding to the image's non-information zone (e.g., to the driver) can be reduced in the case where ability to acquire the required information is guaranteed. Thereby, the safety of the display device and the head-up display system (for example, a vehicle-mounted head-up display system) which are in use and adopt the display method can be promoted.

Figure 14:
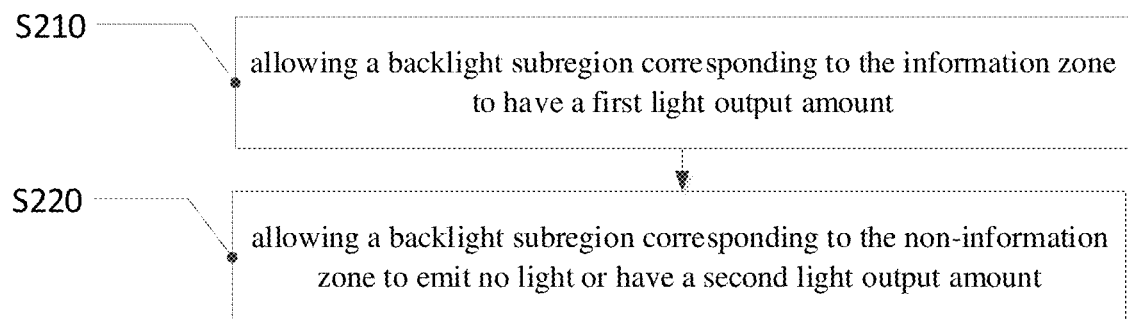
FIG. 14 is an exemplary method for implementing step S200 as illustrated in FIG. 13.

For example, the display module may include a backlight module, and the backlight module includes a plurality of backlight subregions. For example, in the step S200, allowing of the brightness of a display pixel, with the lowest brightness in the first region, in the first region of the display module to be higher than brightness of any of display pixels in the second region of the display module may include the following steps (see FIG. 14).

Step S210: allowing a backlight subregion corresponding to the information zone to have a first light output amount.

Step S220: allowing a backlight subregion corresponding to the non-information zone to emit no light or have a second light output amount, in which the first light output amount is higher than the second light output amount.

For example, the backlight module may include a light guiding plate and a light source; the light source is configured for providing light to the light guiding plate and may include a plurality of luminous elements, and each of the backlight subregions includes at least one of the luminous elements.

For example, by allowing the backlight subregion corresponding to the non-information zone not to emit light or to have a second light output amount, the brightness of the display subarea of the display module corresponding to the non-information zone of the input image can be reduced (for example, the brightness of the display subarea of the display module corresponding to the non-information zone of the input image is made to be zero). Thereby, contrast of an image displayed by the display device adopting the display method can be increased, and power consumption of the display device adopting the display method can be reduced. In addition, adverse interference of light corresponding to the image's non-information zone (e.g., to a driver) can also be reduced in the case where it is guaranteed that the driver can obtain the required information.

For example, in the step S210, allowing of the backlight subregion corresponding to the information zone to have the first light output amount includes: allowing a luminous element of the backlight subregion corresponding to the information zone to be in a turned-on state. For example, in the step S210, allowing of the backlight subregion corresponding to the non-information zone to emit no light or to have the second light output amount includes: allowing a luminous element of the backlight subregion corresponding to the non-information zone to be in a turned-off state or a brightness reduced state.

For example, by allowing a luminous element of a backlight subregion corresponding to the information zone to be in a turned-on state, and allowing a luminous element of a backlight subregion corresponding to the non-information zone to be in a turned-off state or in a luminance reduced state, the backlight subregion corresponding to the information zone can be made to have the first light output amount, and the backlight subregion corresponding to the non-information zone can be made to emit no light or to have the second light output amount. Therefore, the brightness of a display subarea of the display module corresponding to the non-information zone of the input image can be reduced. In this way, the brightness of a display pixel, with the lowest brightness in the first region (i.e., the display subarea of the display module corresponding to the information zone of the input image), in the first region of the display module can be made to be higher than the brightness of any of display pixels in the second region (i.e., the display subarea of the display module corresponding to the non-information zone of the input image) of the display module, and then, contrast of an image displayed by a display device adopting the display method is promoted, and power consumption of the display device adopting the display method is reduced. Furthermore, it is also possible to reduce the interference of light corresponding to the image's non-information zone (e.g., to a driver) in the case where ability to obtain the required information is guaranteed.

Figure 15:
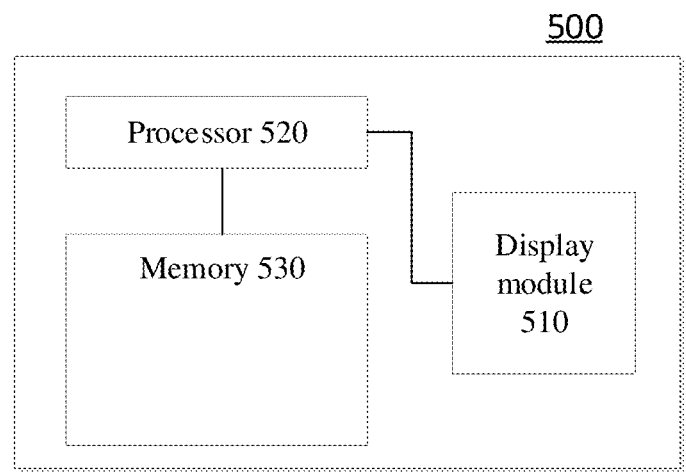
FIG. 15 is an exemplary block diagram illustrating another display device provided by at least one embodiment of the present disclosure.

At least one embodiment of the present disclosure further provides a display device. For example, as illustrated in FIG. 15, the display device 500 may include a display module 510, a processor 520 and a memory 530.

For example, the display module includes a plurality of display subareas; and the memory has computer program instructions suitable to be executed by the processor stored therein. When the computer program instructions being executed by the processor, one or more of the following steps is/are performed: performing an analysis of the input image received, so as to obtain an information zone of the input image and a non-information zone outside the information zone; controlling the display module so as to allow brightness of a display pixel, with the lowest brightness in a first region, in the first region of the display module to be higher than brightness of any of display pixels in a second region of the display module when the display module displays an input image. Here, the first region of the display module is a display subarea of the display module corresponding to the information zone of the input image, and the second region of the display module is a display subarea of the display module corresponding to the non-information zone of the input image.

For example, by way of making the brightness of a display pixel, with the lowest brightness in a first region (i.e. the display subarea of the display module corresponding to the information zone of the input image), in the first region of the display module be higher than the brightness of any of display pixels in a second region (that is, the display subarea of the display module corresponding to the non-information zone of the input image) of the display module, it is possible to reduce interference of light corresponding to the image's non-information zone (e.g., to a driver) in the case where ability to acquire the required information is guaranteed. Thereby, the safety of a head-up display system (for example, a head-up display system) including the display device in use can be promoted.

In an embodiment of the present disclosure, the processor may be a central processing unit (CPU), a field programmable logic array (FPGA), a microcomputer unit (MCU), a digital signal processor (DSP), an application specific integrated circuit (ASIC) or other logic operational unit having a data processing capability and/or program execution capability.

In an embodiment of the present disclosure, the controller may include one or more processors.

In an embodiment of the present disclosure, the image analysis device may include one or more processors.

Figure 16:
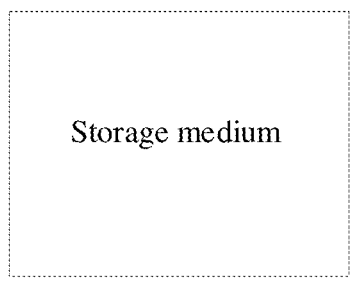
FIG. 16 is an exemplary block diagram illustrating a storage medium provided by at least one embodiment of the present disclosure.

At least one embodiment of the present disclosure provides a storage medium. For example, as illustrated in FIG. 16, the storage medium has computer program instructions stored therein. When the computer program instructions being executed by the processor, one or more of the following steps is/are performed: performing an analysis of the input image received; so as to obtain an information zone of the input image and a non-information zone outside the information zone; controlling the display module so as to allow brightness of a display pixel, with the lowest brightness in a first region (that is, a display subarea of the display module corresponding to the information zone of the input image), in the first region of the display module to be greater than brightness of any of display pixels in a second region (i.e., a display subarea of the display module corresponding to the non-information zone of the input image) of the display module when a display module displays an input image.

The storage medium may include computer readable storage medium in various forms, such as a volatile memory and/or a non-volatile memory. The volatile memory may, for example, include a random access memory (RAM) and/or a cache, etc. The non-volatile memory may, for example, include a magnetic storage medium, an optical storage medium, a semiconductor storage medium, such as a read-only memory (ROM), a hard disk, a flash memory, etc.

For example, by way of making the brightness of a display pixel, with the lowest brightness in a first region (i.e. a display subarea of the display module corresponding to the information zone of the input image), in the first region of the display module be higher than the brightness of any of display pixels in a second region (that is, a display subarea of the display module corresponding to the non-information zone of the input image) of the display module, it is possible to reduce interference of light corresponding to the image's non-information zone (e.g., to a driver) in the case where ability to acquire the required information is guaranteed. Thereby, the safety in use can be promoted.

Embodiments of the present disclosure provides a display device and method, a head-up display system, a means of transportation and a storage medium, by which the improvement of safety during using is realized.

Although detailed description has been given above to the present disclosure with general description and embodiments, it shall be apparent to those skilled in the art that some modifications or improvements may be made on the basis of the embodiments of the present disclosure. Therefore, all the modifications or improvements made without departing from the spirit of the present disclosure shall all fall within the scope of protection of the present disclosure.

What are described above is related to the illustrative embodiments of the disclosure only and not limitative to the scope of the disclosure; the scopes of the disclosure are defined by the accompanying claims.

What is claimed is:

1. A display device, comprising a display module, an image analysis device and a controller,
   wherein the display module is divided into a plurality of display subareas and comprises a backlight module, a liquid crystal panel, and a light shading layer, the light shading layer is between the liquid crystal panel and the backlight module and is configured to reduce a divergence angle of light that is incident onto the liquid crystal panel, and each of the display subareas comprises at least one display pixel;
   the image analysis device is configured to perform an analysis of an input image received by the image analysis device, so as to obtain an information zone of the input image and a non-information zone outside of the information zone, wherein the information zone and the non-information zone are obtained by:
      dividing the input image into a plurality of image subregions based on a number and a shape of each of the display subareas;
      extracting texts and symbols in the image by a feature extraction algorithm; and
      determining, according to a location of the extracted texts and symbols, whether any of the plurality of image subregions are the information zone of the input image, or the non-information zone of the input image;
   the controller is configured to render a brightness of a display pixel, with a lowest brightness in a first region, in the first region of the display module higher than a brightness of any display pixel in at least part of a second region of the display module, when the display module displays the input image, wherein the first region of the display module is a display subarea of the display module corresponding to the information zone of the input image, and the second region of the display module is a display subarea of the display module corresponding to the non-information zone of the input image;
   the light shading layer comprises light transmissive zones and light shading zones for separating the light transmissive zones;

the light shading zones partially overlap with an orthographic projection of each of a plurality of light guiding regions on the light shading layer; and an orthographic projection of an edge of the each of the light guiding regions on the light shading layer is completely covered by the light shading zones, wherein the edge is adjacent to another of the light guiding regions.

2. The display device according to claim 1, wherein the controller is further configured to render the brightness of the display pixel, with the lowest brightness in the first region, in the first region of the display module higher than a brightness of any display pixel in the second region of the display module, when the display module displays the input image.

3. The display device according to claim 1, wherein
the backlight module comprises a plurality of backlight subregions;
the plurality of backlight subregions respectively correspond to the plurality of display subareas of the display module; and
the controller is configured to let a backlight subregion corresponding to the information zone have a first light output amount, and to let a backlight subregion corresponding to the non-information zone have a second light output amount, wherein the first light output amount is higher than the second light output amount.

4. The display device according to claim 3, wherein the second light output amount is equal to zero.

5. The display device according to claim 3, wherein the backlight module comprises a light guiding plate and a light source;
the light source comprises a plurality of luminous elements, and each of the backlight subregions comprises at least one of the luminous elements; and
the controller is configured to allow a luminous element of the backlight subregion corresponding to the information zone to be in a turned-on state, so as to allow the backlight subregion corresponding to the information zone to have the first light output amount, and the controller is further configured to allow a luminous element of the backlight subregion corresponding to the non-information zone to be in a turned-off state or a brightness reduced state, so as to allow the backlight subregion corresponding to the non-information zone to have the second light output amount.

6. The display device according to claim 5, wherein the plurality of light guiding regions respectively correspond to the plurality of backlight subregions; and
a position corresponding to each light-entering face of each of the light guiding regions is provided with at least one of the luminous elements.

7. The display device according to claim 6, wherein the each light-entering face is at least a partial region of a side surface of the light guiding plate; and
the plurality of light guiding regions are in a single row, and the each of the light guiding regions comprises one light-entering face or two light-entering faces.

8. The display device according to claim 6, wherein the each light-entering face is at least a partial region of a side surface of the light guiding plate; and
the plurality of light guiding regions are in two rows, and the each of the light guiding regions comprises one light-entering face.

9. The display device according to claim 6, wherein the light guiding plate further comprises a light blocking structure formed on an interface between light guiding regions that are adjacent.

10. A head-up display system, comprising the display device according to claim 1.

11. A means of transportation, comprising the display device according to claim 1.

12. A display method for a display device, wherein the display device comprises a display module, the display module is divided into a plurality of display subareas and comprises a backlight module, a liquid crystal panel, and a light shading layer, the light shading layer is between the liquid crystal panel and the backlight module and is configured to reduce a divergence angle of light that is incident onto the liquid crystal panel, and each of the display subareas comprises at least one display pixel, the method comprising:
performing an analysis of an input image received, so as to obtain an information zone of the input image and a non-information zone outside of the information zone, wherein the information zone and the non-information zone are obtained by:
dividing the input image into a plurality of image subregions based on a number and a shape of each of the plurality of display subareas;
extracting texts and symbols in the image by a feature extraction algorithm; and
determining, according to a location of the extracted texts and symbols, whether any of the plurality of image subregions is the information zone of the input image, or the non-information zone of the input image; and
rendering a brightness of a display pixel, with a lowest brightness in a first region, in the first region of the display module higher than brightness of any display pixel in at least part of a second region of the display module when the input image is displayed by the display module, wherein the first region of the display module is a display subarea of the display module corresponding to the information zone of the input image, and the second region of the display module is a display subarea of the display module corresponding to the non-information zone of the input image,
wherein the light shading layer comprises light transmissive zones and light shading zones for separating the light transmissive zones,
the light shading zones partially overlap with an orthographic projection of each of a plurality of light guiding regions on the light shading layer, and
an orthographic projection of an edge of the each of the light guiding regions on the light shading layer is completely covered by the light shading zones, wherein the edge is adjacent to another of the light guiding regions.

13. The display method according to claim 12, wherein the brightness of the display pixel, with the lowest brightness in the first region, in the first region of the display module is allowed to be higher than brightness of any display pixel in the second region of the display module when the input image is displayed by the display module.

14. The display method according to claim 13, wherein
the backlight module comprises a plurality of backlight subregions respectively corresponding to the plurality of display subareas of the display module, and
allowing of the brightness of the display pixel, with the lowest brightness in the first region, in the first region of the display module to be higher than the brightness of any display pixel in the second region of the display module comprises:
- allowing a backlight subregion corresponding to the information zone to have a first light output amount, and
- allowing a backlight subregion corresponding to the non-information zone to have a second light output amount, wherein the first light output amount is higher than the second light output amount.

15. The display method according to claim 14, wherein the second light output amount is equal to zero.

16. The display method according to claim 14, wherein the backlight module comprises a light guiding plate and a light source;
- the light source comprises a plurality of luminous elements, and each of the backlight subregions comprises at least one of the luminous elements;
- allowing of the backlight subregion corresponding to the information zone to have the first light output amount comprises: allowing a luminous element of the backlight subregion corresponding to the information zone to be in a turned-on state; and
- allowing of the backlight subregion corresponding to the non-information zone to have the second light output amount comprises: allowing a luminous element of the backlight subregion corresponding to the non-information zone to be in a turned-off state or a brightness reduced state.

17. A storage medium, wherein computer program instructions are stored in the storage medium, and the computer program instructions, upon being executed by a processor, carry out the method according to claim 12.

18. A display device, comprising a display module, a processor, and a memory,
- wherein the display module is divided into a plurality of display subareas and comprises a backlight module, a liquid crystal panel, and a light shading layer, the light shading layer is between the liquid crystal panel and the backlight module and is configured to reduce a divergence angle of light that is incident onto the liquid crystal panel, and each of the display subareas comprises at least one display pixel;
- computer program instructions suitable to be executed by the processor are stored in the memory; and
- upon being executed by the processor, the computer program instructions carry out a method comprising:
  - performing an analysis of an input image received, so as to obtain an information zone of the input image and a non-information zone outside of the information zone, wherein the information zone and the non-information zone are obtained by:
    - dividing the input image into a plurality of image subregions based on a number and a shape of each of the plurality of display subareas;
    - extracting texts and symbols in the image by a feature extraction algorithm; and
    - determining, according to a location of the extracted texts and symbols, whether any of the plurality of image subregions is the information zone of the input image, or the non-information zone of the input image; and
  - controlling the display module, so as to allow brightness of a display pixel, with a lowest brightness in a first region, in the first region of the display module to be higher than brightness of any display pixel in at least part of a second region of the display module when the display module displays the input image, wherein the first region of the display module is a display subarea of the display module corresponding to the information zone of the input image, and the second region of the display module is a display subarea of the display module corresponding to the non-information zone of the input image,
- wherein the light shading layer comprises light transmissive zones and light shading zones for separating the light transmissive zones,
- the light shading zones partially overlap with an orthographic projection of each of a plurality of light guiding regions on the light shading layer, and
- an orthographic projection of an edge of the each of the light guiding regions on the light shading layer is completely covered by the light shading zones, wherein the edge is adjacent to another of the light guiding regions.

* * * * *